US006467003B1

United States Patent
Doerenberg et al.

(10) Patent No.: US 6,467,003 B1
(45) Date of Patent: Oct. 15, 2002

(54) FAULT TOLERANT DATA COMMUNICATION NETWORK

(75) Inventors: Frank M. G. Doerenberg; Michael Topic, both of Redmond, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/454,054

(22) Filed: Dec. 2, 1999

Related U.S. Application Data

(63) Continuation of application No. 09/009,463, filed on Jan. 20, 1998.
(60) Provisional application No. 60/113,787, filed on Dec. 22, 1998, and provisional application No. 60/035,256, filed on Jan. 21, 1997.

(51) Int. Cl.[7] .............................................. G06F 13/00
(52) U.S. Cl. ......................................... 710/117; 710/45
(58) Field of Search ................................ 710/117, 124, 710/305, 45; 370/60

(56) References Cited

U.S. PATENT DOCUMENTS

| | | | | | |
|---|---|---|---|---|---|
| 6,052,753 | A | * | 4/2000 | Doerenberg et al. | 710/29 |
| 6,138,200 | A | * | 10/2000 | Ogilvie | 710/112 |
| 6,157,978 | A | * | 12/2000 | Ng et al. | 710/117 |
| 6,178,475 | B1 | * | 1/2001 | O'Brien | 710/113 |

* cited by examiner

*Primary Examiner*—Glenn A. Auve

(57) ABSTRACT

The present invention provides a fault tolerant bus architecture and protocol for use in an Integrated Hazard Avoidance System of the type generally used in avionics applications. In addition, the present invention may also be used in applications, aviation and otherwise, wherein data is to be handled with a high degree of integrity and in a fault tolerant manner. Such applications may include for example, the banking industry or other safety critical processing functions, including but not limited to environmental control.

33 Claims, 18 Drawing Sheets

FAULT TOLERANT DATA COMMUNICATION NETWORK

This application claims the benefit of U.S. Provisional Application Ser. No. 60/113,787, filed in the names of Frank M. G. Doerenberg and Michael Topic on Dec. 22, 1998, the complete disclosure of which is incorporated herein by reference. This application is a Continuation of U.S. application Ser. No. 09/009,463, filing date Jan. 20, 1998, now U.S. Pat. No. 6,052,753, entitled "Fault Tolerant Data Bus", which claims the benefit of U.S. Provisional Application Ser. No. 60/035,856 filed Jan. 21, 1997, the complete disclosures of which are incorporated herein by reference.

This application is related to application Ser. No. 09/454,057 filed in the names of the inventors of the instant application on the same day herewith, the entire disclosure of which is included herein by reference.

FIELD OF THE INVENTION

This invention relates to fault tolerant data bus architectures and more particularly to use of such architectures in safety critical avionics.

BACKGROUND OF THE INVENTION

It is generally recognized that there is a need to employ digital computers in applications in which improper operation could have severe consequences. For example, a sophisticated flight hazard warning system has been developed for aircraft which utilizes a number of independent warning systems including a ground proximity warning system, a wind shear detection system and a collision avoidance system. This particular system is generally described in U.S. patent application Ser. No. 08/847,328, filed Apr. 23, 1997 and entitled: "Integrated Hazard Avoidance System", and is incorporated herein by reference. In the preferred embodiment described therein, a central computer, which may include multiple processors for redundancy, receives via various input/output (I/O) modules various types of flight data useful for anticipating and warning of hazardous flight conditions. Such information may include but is not limited to: barometric altitude, radio altitude, roll and pitch, airspeed, flap setting, gear position, and navigation data. This information is communicated to the central computer via a data bus.

For such an integrated warning system to provide warnings with a high degree of integrity, the data operated upon and instructions issued by the central computer must be accurate. A bus architecture to transfer data between each of the I/O modules in an orderly manner must therefore exist. Data placed on the bus must also be accurate and without error. Also, it is important to ensure, to the extent possible, that the individual systems execute the warning programs correctly.

There have been various approaches to solving these problems. For example such a system is described in ARINC Specification 659 entitled Backplane Data Bus published on Dec. 27, 1993 by Aeronautical Radio, Inc. In this system the bus includes four data lines and has a pair of Bus Interface Units ("BIU") for each processor or node on the data system where each BIU is connected to two data lines in the bus. Data is transferred according to a time schedule contained in a table memory associated with each BIU. The tables define the length of time windows on the bus and contain the source and destination addresses in the processor memory for each message transmitted on the bus. These types of systems also use for some applications two processors that operate in a lock-step arrangement with additional logic provided to cross-compare the activity of the two processors. The two processors, each with its own memory, execute identical copies of a software application in exact synchrony. This approach usually requires that the two processors must be driven by clock signals that are synchronized.

Although such systems have high data integrity and provide for fault tolerant operation, they have a number of disadvantages. For example the use of tables having data source and destination addresses for each application program in the processor memory makes it difficult to reprogram the system for new applications because each table in the system must be reprogrammed. In addition, the use of two processor operating in lock-step reduces the flexibility of the system since it is not possible to run two different programs on the processors at the same time.

SUMMARY OF THE INVENTION

The present invention provides a fault tolerant bus communication protocol for use in an Integrated Hazard Avoidance System of the type generally described above. In addition, the present invention may also be used in applications, aviation and otherwise, wherein data is to be handled with a high degree of integrity and in a fault tolerant manner. Such applications may include for example, the banking industry or other safety critical processing functions, including but not limited to environmental control.

In the present invention as applied to an integrated flight hazard avoidance system, the system is partitioned into modules. An inter-module backplane data bus is shared between the modules to transfer data between the modules. The backplane bus according to the present invention is fault tolerant, multi-drop, time-multiplexed broadcast bus. The inter-module backplane bus includes multiple independent data lines grouped into multiple data communication networks. In a preferred embodiment, the inter-module backplane bus includes four independent data lines divided into two data communication networks each having two data lines. Each module is provided with reception and/or transmission privileges on one or more of the data lines of each data communication network. The modules themselves may host multiple application functions that also share the backplane bus. In a preferred embodiment of the invention, serial data is transferred in a semi-duplex manner.

According to one aspect of the present invention, each of the processing nodes performs a processing function which is replicated in one or more other processing nodes. Multiple ones of the processing nodes are physically isolated in a resource enclosure. Preferably, each of the processing nodes in a resource enclosure performs a different processing function. According to another aspect of the present invention, each of the processing nodes in the resource enclosure is replicated in at least one other resource enclosure.

According to one aspect of the present invention, each module, or processing node, comprises a single source microprocessor which executes instructions to place data onto the bus.

According to another aspect of the present invention, the data is placed on the bus using a data bus protocol that allocates to each node a predetermined number of slots in which to transmit. Each module contains a time table memory associated with each of two arbitration circuits that stores the bus protocol information to enable the processing node to place data in a predetermined channel on the bus at the appropriate time period. Each arbitration circuit independently determines the transmission time period allocated to the associated microprocessor. If both interface controllers are in agreement, an access window is opened between the microprocessor and the bus, and the data is placed on the bus.

According to yet another aspect of the present invention, a dual source operation may be used wherein each arbitration circuit retrieves data via a separate and independent microprocessor and associated memory.

According to still another aspect of the present invention, the dual source architecture may be utilized as a single source operation on a selectable basis. This implementation of the dual source architecture permits each microprocessor within the node to simultaneously execute separate applications for greater efficiency when the particular data being processed does not require the degree of robustness necessary for dual sourced operations. The resulting system is thereby made more efficient.

According to yet another aspect of the present invention, a method is provided for transmitting data over a data bus between multiple processing nodes wherein each of the processing nodes includes at least one processor. The method includes dividing transmission over a first data line of a data bus into a first group of time slots and dividing transmission over a second data line of said data bus into a second group of time slots. Each of the first and second groups of time slots are divided into groups of channels. Data are transmitted from a first processing node on the first group of channels and other data are transmitted from a second processing node on the second group of channels.

A first portion of the data from the first processing node are selectively received on the first group of channels in a pair of arbitration circuits located in the second processing node, each of the arbitration circuits, including an associated time table defining the first channel containing the first portion of data, and transferring that first portion of data to an application memory coupled to a processor in the first processing node. A second portion of data from the second processing node are selectively received on the second group of channels in a pair of arbitration circuits located in the first processing node, each of the arbitration circuits having an associated a time table defining the second channel containing the second portion of data, and transferring that second portion of data to an application memory coupled to a processor in the second processing node.

According to yet another aspect of the present invention, one or more of the processing nodes includes two or more processors, each processor including an application memory coupled thereto and executing identical application programs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
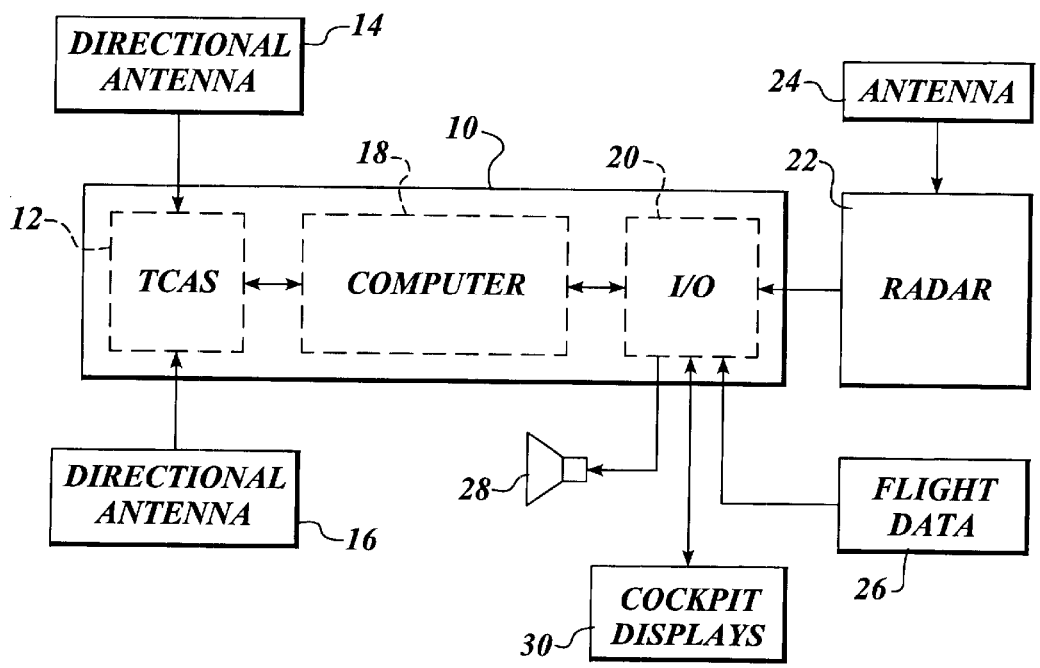
FIG. 1 is a block diagram of an integrated hazard avoidance system illustrating an application of a data bus system according to the invention.

FIG. 1 details in block diagram form an integrated hazard avoidance system (IHAS) 10 for aircraft to illustrate a system in which the data bus system of the present invention can be incorporated. Because the IHAS 10 includes a number of microprocessor based systems as well as receiving data from other systems, it is desirable that data be transmitted with a high degree of integrity between the various components of the system. Included in the IHAS 10 is a conventional traffic alert and collision avoidance system (TCAS) 12 which is connected to a pair of directional antennae 14 and 16. A central computer 18 is connected to TCAS 10 and to I/O module 20. Central computer 18, which can include multiple processors for redundancy, performs the hazard detecting and alerting functions as described in provisional application 60/016,277 incorporated herein by reference. Flight data as indicated generally by block 26 are input to the central computer 10 via I/O module 20.

Central computer 18 uses conventional programs for generating the basic ground proximity warnings (GPWS) including enhanced ground proximity warnings (EGPWS), windshear warnings including predictive and reactive windshear alerts, and TCAS alerts.

Descriptions of suitable GPWS systems are provided in U.S. Pat. Nos. 4,567,483, 5,220,322; 4,433,323; 5,187,478 and 4,684,948 all of which are hereby incorporated by reference. Descriptions of suitable EGPWS systems are provided in Patent Application Ser. Nos. 08/509,660 and 08/509,702 which are hereby incorporated by reference. Suitable windshear systems are described in U.S. Pat. Nos. 4,905,000; 5,059,964, 4,725,811; 4,947,164; 5,153,588 and 4,891,642 and are hereby incorporated by reference. Suitable commercially available TCAS systems and associated hardware are described in U.S. Pat. Nos. 5,122808; 5,272,725; 4,914,733; 5,008,844 and 4,855,748 and in published documents: "{Pilot's Guide TCAS II CAS 67/A81A Bendix/King Traffic Alert and Collision Avoidance Systems" and "Pilot's Guide CAS 66A Bendix/King TCAS I Collision Avoidance System" and are hereby all incorporated by reference.

The IHAS 10 of FIGS. 1 may host applications of any criticality level form non-essential to flight critical. The system architecture allows new applications to be added through software changes, without requiring additional hardware, by employing central processors along with common power and I/O interfaces. The IHAS system is not merely a collection of individual functions packaged in a single unit. IHAS is a complete system design with hardware processing modules, such as I/O modules, processor units and a dual power supply. A current exception to this philosophy are the TCAS/Mode S RF module, and the Radar RF module. The reason for these exceptions is that the highly specialized functions are more optimally included in other than the general processing hardware.

One possible set of functions for IHAS include:
Weather Radar with Predictive Windshear Detection
Ground Proximity Warning with Reactive Windshear Detection
TCAS
Mode S Transponder
Flight Data Acquisition Unit and Data Management System Other functions and combinations of functions can also be included in the IHAS 10. The IHAS design provides an open architecture environment that allows functions and components to be developed by the aircraft manufacturer, airline or other vendors.

By centralizing the crew alerting functions of the hazard warning systems included in the IHAS 10, the IHAS 10 can eliminate conflicting and redundant crew messages and provide optimal message prioritization. The present invention, permits the exchange of data from each of the modules of IHAS in a manner that ensures data integrity as well as in a fault tolerant manner. The data bus architecture of the present invention thus permits an integrated hazard warning device for aviation to operate with robustness and integrity of data processing and with the obvious safety benefits thereof. False or inaccurate warnings are thereby reduced or eliminated and the likelihood that a warning will fail to be given is also reduced or eliminated. The present invention also provides for a bus protocol such that data collisions are avoided. Furthermore, as discussed in detail below, the present invention also provides for application specific levels of robustness and fault tolerance depending upon user preference or the safety criticality of the associated application.

Although a preferred embodiment of the present invention is described in connection with the IHAS application shown in FIG. 1, it is to be understood that the present invention is applicable to any application where fault tolerant and robust data processing bus architectures are desirable.

Basic Architecture

Figure 2:
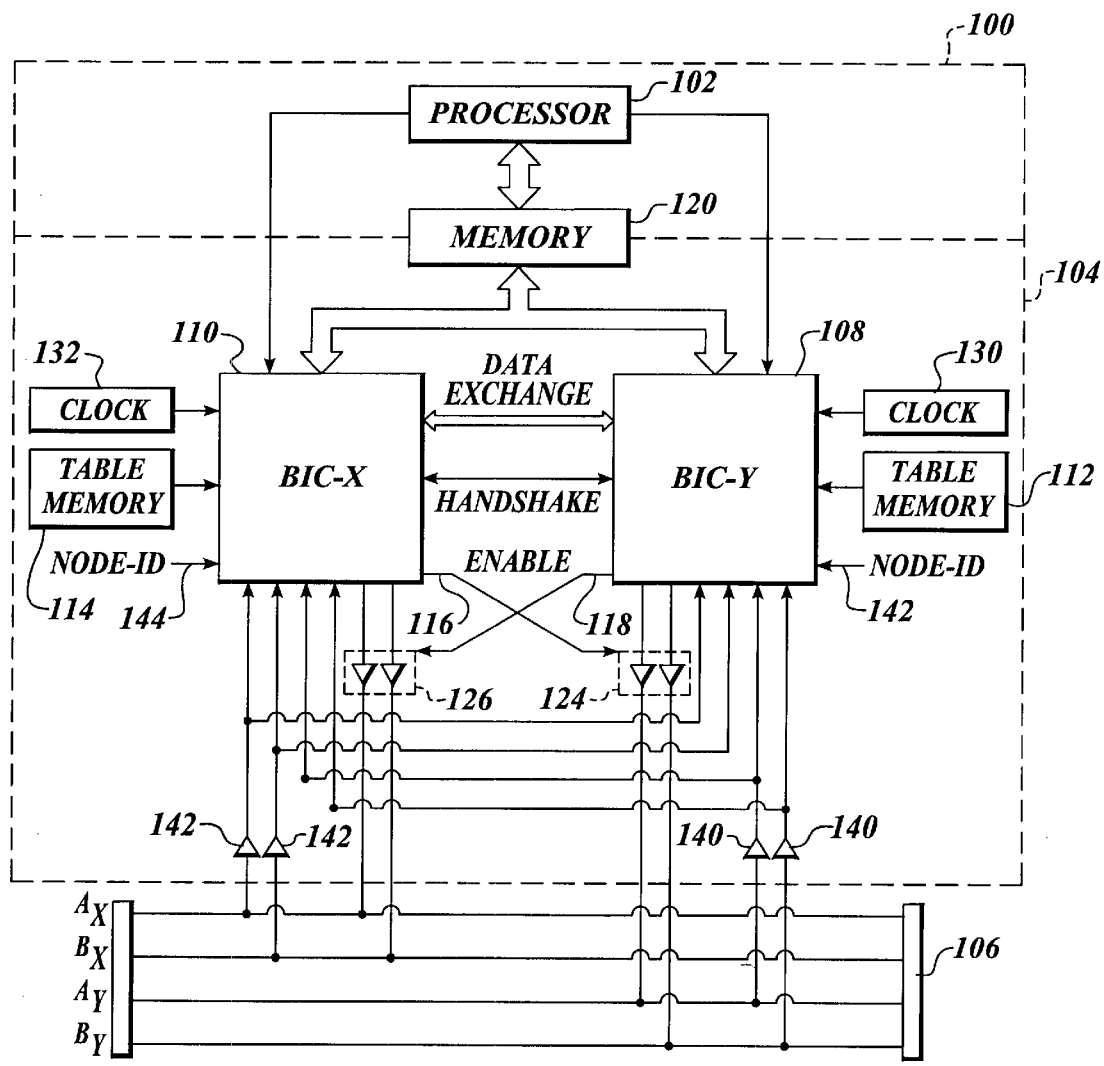
FIG. 2 is a block diagram of a node of a data bus system utilizing a single processor and a pair of bus interface controllers according to the invention.

FIG. 2 illustrates an example of a basic backplane bus architecture including a node 100 containing a single processor 102, such as a microprocessor, of the data bus system according to the invention. For convenience, a glossary of terms used in this description is attached hereto as Appendix A. One objective of the invention is to provide a high-integrity, time-multiplexed data bus for the purpose of transferring digital data between nodes within the same system enclosure. The processing node 100 consists of the processing entity 102 that can host multiple application functions, including input/output functions, if the node is an I/O module for example, and a backplane bus interface 104. The node 100 is connected to a set of four bus signal lines, Ax, Bx, Ay and By indicated by a reference numeral 106. In the preferred embodiment, there is no centralized control of the bus. The bus interface 104 includes the following major components: a pair of Bus Interface Controllers ("BICs") 108 and 110; independent clock oscillators 130 and 132; a pair of independent table memories 112 and 114; backplane transceivers; and physical-ID ports.

Figure 3:
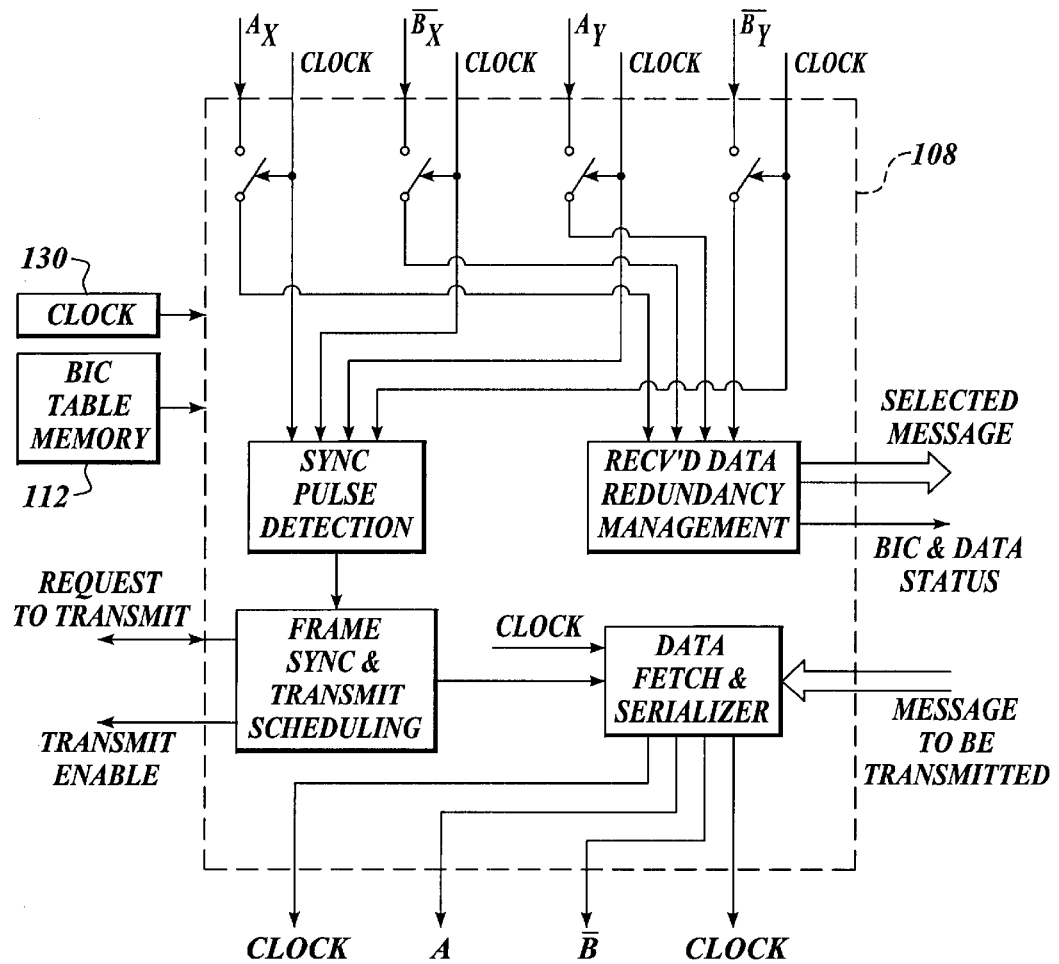
FIG. 3 is a block diagram of the bus interface controller of FIG. 2.

In a preferred embodiment, the bus 106 has four transmission lines in a dual-dual configuration. Each node 100 contains the two BICs 108 and 110. The purpose of the BICs 108 and 110 is to manage all data transfers between the bus 106 and a memory 120 associated with the host processor 102. They format data-to-be-transmitted into messages, and transmit them onto the bus 106 during uniquely designated time-slots. The BICs 108 and 110 independently determine if such a time-slot is coming up, and cross-enable each other's bus line drivers using a pair of enable lines 116 and 118 accordingly. In addition, the BICs 108 and 110 perform decoding, cross-checking and fault detection on received data. Each BIC-pairs 108 and 110 also synchronizes to BIC-pairs in other nodes. The above BIC functions are illustrated in FIG. 3.

Each of the BICs 108 and 110 has its own independent clock oscillator 130 and 132. This prevents failure of a single oscillator from causing the associated node 100 from transmitting during another node's time-slots, and thereby causing total failure of the bus for all nodes.

Each the BICs 108 and 110 has its own table memory 112 and 114. This memory contains information regarding the unique allocation of transmission time-slots to various nodes, and the boundaries of the associated areas in the processor's memory 120 where the BICs 108 and 110 are allowed to read data-to-be transmitted, or write received and validated data. The latter write is done, based on the destination address that is transmitted as part of the message.

Each of the BICs 108 and 110 has a pair of independent, both physically and electrically, bus line drivers 124 and 126. The drivers of one BIC are enabled, via enable lines 116 and 118, by the other BIC of the same BIC-pair. The drivers 124 and 126 are of a type that allows multiple drivers to be active simultaneously either for the purpose of synchronizing, or due to a fault, without causing damage to any of the drivers. The BICs 108 and 110 also share a set of four bus line receivers indicated at 140 and 142.

Each of the BICs 108 and 110 is connected to the four physically and electrically independent sub-busses that make up the backplane data bus 106. The sub-busses are labeled Ax, Bx, Ay and By. Each sub-bus has one clock and four data lines (not shown). Hence, the data bus 106 comprises 4×(4+1)=20 bus lines. The four sub-busses carry identical data values. This provides data redundancy for fault tolerance. The four data lines in each sub-bus provide parallel redundancy for bus throughput. The drivers of one BIC are enabled by the other BIC of the same BIC-pair. The drivers 124 and 126 are of a type that allows multiple drivers to be active simultaneously either for the purpose of synchronizing, or due to a fault without causing damage to any of the drivers e.g., "open collector" type.

Each BIC 108 and 110 has a port indicated at 143 and 144 for the purpose of uniquely identifying the node within the system enclosure, as well as the position of that enclosure (e.g., "left" vs. "right" cabinet or LRU in for example the IHAS 10 shown in FIG. 1). The ports are strapped separately for each BIC.

Data is transmitted serially, onto duplicate paths by each BIC 108 and 110, e.g., simultaneously onto four bus lines. The nominal data rate is 32 MBPS. This provides a data throughput of 4×32=128 MBPS total. The BICs use the four clock lines to clock-in the data streams from their respective sub-bus data lines. The clock signals are generated by the BIC-pair that is transmitting data.

The signal levels of data bits on the Ax and Ay sub-busses are opposite to those on the Bx and By sub-busses. This provide protection against certain common-mode interference; this signal encoding, combined with an Error Detection Code checksum in each message and pair-wise comparison of the four message copies, enables effective verification of the integrity of each transmission by all receiving BICs. The BICs 108 and 110 use the clock signals on the clock lines to clock-in data streams from the bus. The data bits on one bus line from each BIC are inverted.

Figure 4:
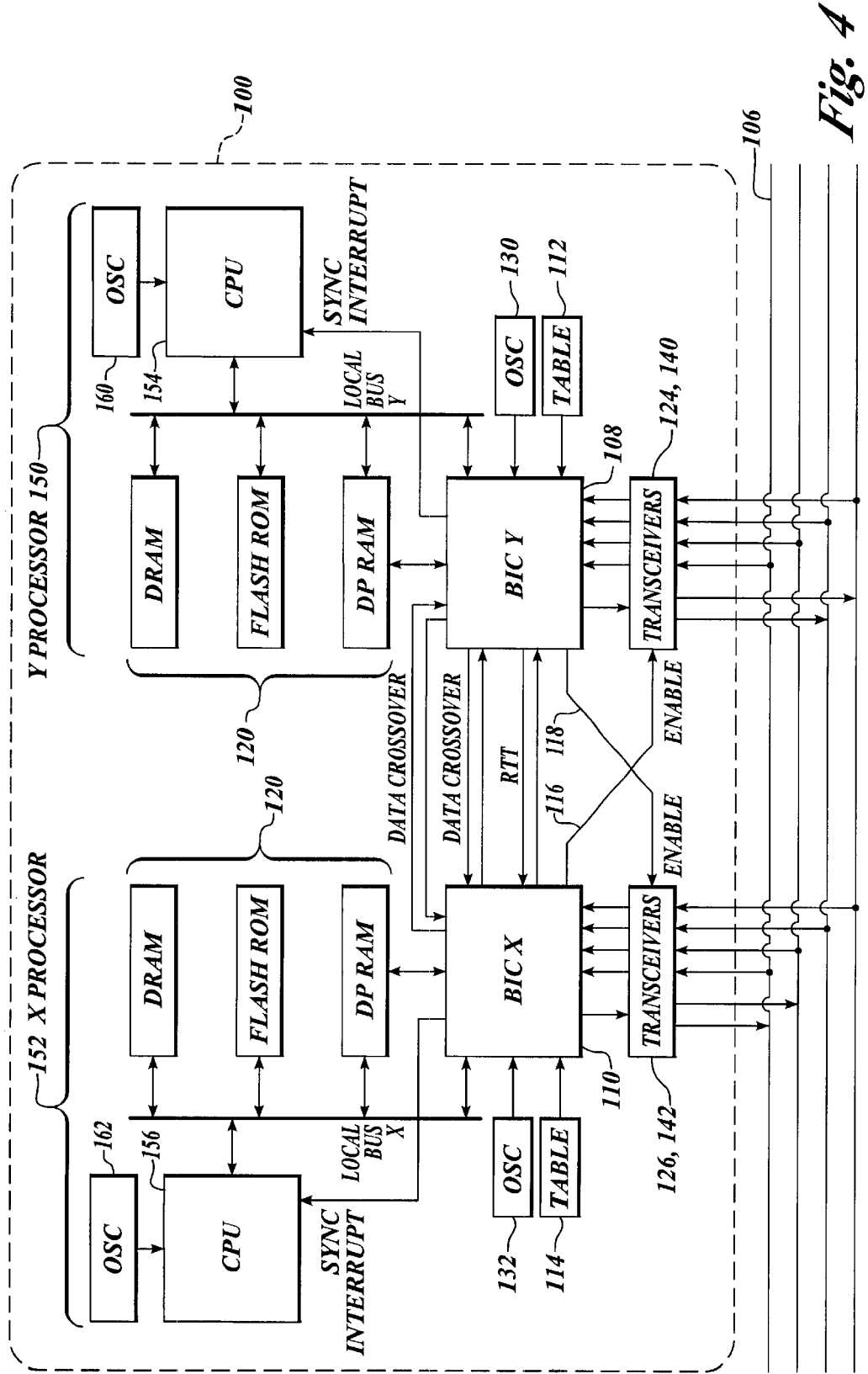
FIG. 4 is a block diagram of a node of the data bus system utilizing two processors and two bus interface controllers according to the invention.

FIG. 4 describes an alternate backplane bus interface node architecture in which the node 100 includes: a pair of processors 150 and 152, labeled x and y each have a separate CPU or host processor 154 and 156, a separate memory 120 and a separate clock oscillator 160 and 162. In this embodiment, the BIC-y 108 and the BIC-x 110 are connected to the respective processors 150 and 152.

The operation of the bus systems of FIGS. 2 and 4 is explained in detail below.

Bus Dependability

Operational dependability of the Backplane Databus is achieved through a combination of Fault Avoidance, and Fault Tolerance.

Fault Avoidance, through system architecture and design, reduces the probability of or altogether prevents faults from developing in, entering into, or spreading within the bus system. It is provided by several methods, such as: robust resource partitioning and determinism, protection against violation of partitions and fault containment.

In addition, fault avoidance is bolstered by numerous practices that minimize complexity (e.g., of hardware design, number of interconnects, number of operational modes, number of different message types, message protocol), provide physical separation, reduce EMI susceptibility and generation, and increase inherent reliability (e.g., component selection, margins). Of course, the Backplane Databus concept itself reduces system complexity, by integrating numerous point-to-point and broadcast links found in equivalent federated systems.

Fault tolerance is the ability of the bus system to sustain one or more specified faults in a way that is transparent to the operating environment, e.g., without causing failure of the bus system or connected nodes. Fault tolerance is achieved by adding and managing redundancy, both physically (number of data lines), and of information (error detection encoding).

Resource Partitioning

Figure 5:
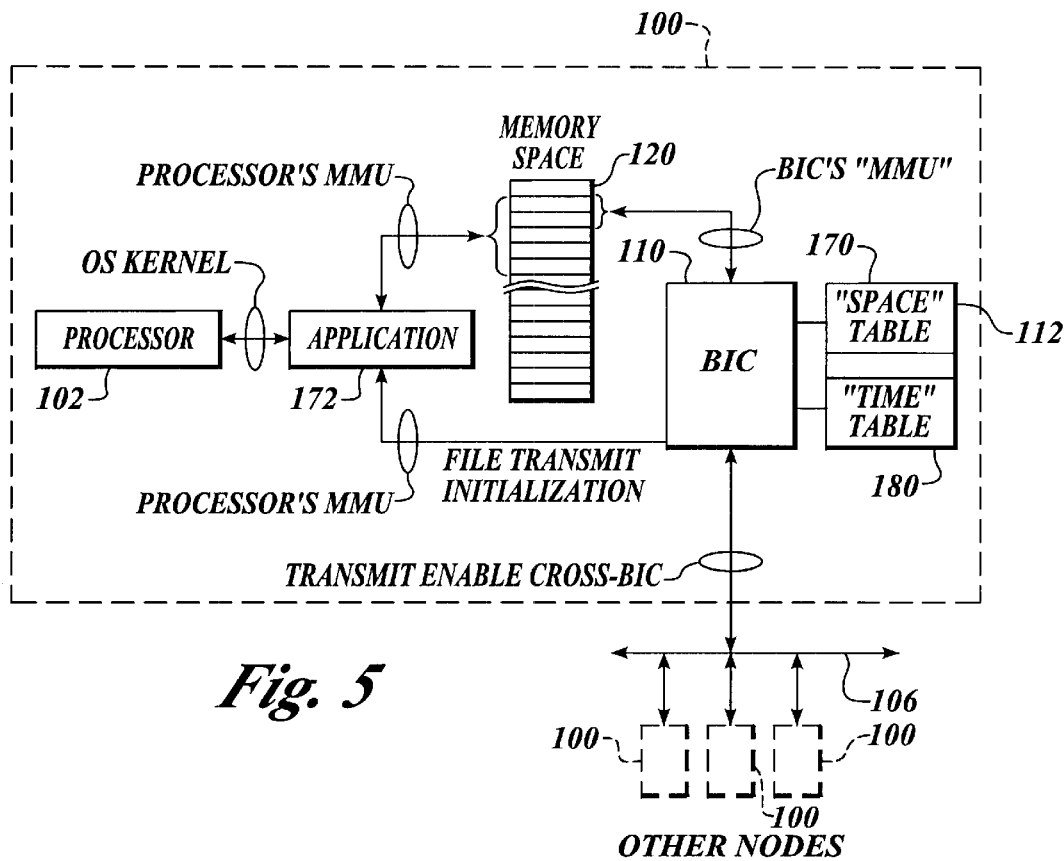
FIG. 5 is a diagram illustrating a memory partition of the single processor node of FIG. 2.

As illustrated by the diagram of FIG. 5, the backplane databus is a system resource that is shared by multiple nodes 100, and by multiple application functions and tasks within each node 100. It has the following time and space dimensions: communication bandwidth (transmission time on the bus), address space in the memory of a transmitting node's host processing entity 102, where the BIC-pair 108 and 110 fetch data that is to be transmitted on the bus, similarly, address space in the receiving node's host memory where the BIC-pair 108 and 110 posts validated received data, register space in the BICs 108 and 110, where the host places parameters to initialize data transmission.

These bus resources shall be partitioned such that each application function has guaranteed and timely access to a predetermined part of these resources, without negatively affecting any other application functions (incl. timely access to their allocated parts of the resources).

In the preferred embodiment of the invention the bus 106 is time-multiplexed in a fully deterministic manner. This time-partitioning is achieved by: dividing bus time into consecutive fixed-length time-slots, that are grouped into fixed-length cyclic frames, using a table-driven protocol that uniquely defines the time-slot configuration and allocation.

For this purpose, each BIC 108 and 110 has a time table memory 180 located in the BIC table memories 112 and 114. This memory 180 contains information that maps each time-slot on the bus 106 to at most a single transmitting node 100 (except for a time-slot dedicated to synchronization). Time-slots for data transmission are grouped into "Channels", each dedicated to a particular source-application in the transmitting node 100. The time table shall map each time-slot to the associated Channel-number. All BICs, such as 108 and 110, in the system will have the same time table contents.

A partitioning scheme in itself does not ensure compliance with the partitioning. Protection is provided against breaches of the partitioning. In one embodiment of the invention, this protection is provided through the dual-BIC architecture: both BICs 108 and 110 of the node 100 independently determine for each time-slot whether the node 100 is allowed to transmit, and, if so, cross-enable each other's bus line drivers 124 and 126. E.g., transmission shall only take place if both BICs 108 and 110 of a BIC-pair agree. In addition, the time table memories 180 are not accessible to the BICs' host processing entity 102. With this arrangement, no action (intentional, inadvertent, or malicious) of the host 102 or its applications, can ever cause a node to transmit during another node's time-slot. Preferably, the time table memories 180 are only programmable via a maintenance action on the data bus system as a whole.

The memory space 120 of node's host processing entity 102 is partitioned such that an application's 172 functions and tasks have exclusive "write" and exclusive (or shared) "read" access privileges to certain predetermined ranges of address space in the memory 120. This space-partitioning is controlled and protected by the host's 102 Memory Management Unit (MMU) function. The boundaries of the applications' memory partitions and the associated access privileges, are provided to the MMU by the kernel of the host's operating system. Certain areas of an application partition's memory space will be allocated to storage of data items that are to be transmitted on the backplane bus 106.

Similarly, there will be a predetermined allocation of a partition's memory space where the application expects received data to appear. The BICs' 108 accesses to the host's memory 120 shall be consistent with this partitioning into "source" and "destination" memory space for each application function.

This memory space-partitioning is achieved with a deterministic table-driven protocol, that uniquely defines the boundaries of each application's "source" and "destination" memory space. For this purpose, each BIC 108 and 110 has its own "Space table" 170 memory in the BIC table memories 112 and 114. This memory 170 includes information that maps each time-slot's channel-number to the boundary addresses of the associated local application's "source" or "destination" memory space. The space table contents are the same for both BICs, such as 108 and 110, of a BIC-pair. However, the contents will differ from node to node: each node has its own set of source and destination application functions, and associated space-partitioning.

This space-partitioning is controlled and protected by a Memory Management Unit (MMU) function in each BIC 108 and 110, based on the mapping information from the space table 170. This partitioning, and protection is the same on the application partition side of the host's memory 120, and on the BIC side of that shared memory. Therefore, the space table 170 can be loaded by the kernel of the host's operating system. The BICs 108 and 110 enable this loading during a limited time window upon power-up/reset of the node 100.

The above described space-partitioning is deterministic down to the level of address ranges between partition boundaries. Determinism down to the individual addresses is provided by the message format protocol: each data message on the bus 106 shall contain an address field that indicates where the data item is to be placed in the destination-application's memory partition, upon receipt. E.g., an individual time-slot is dedicated to a particular node 100 and source-application 172, but not to one particular data item. Hence, the source-application 172 will indicate from which addresses within its source-space the BICs 108 and 110 are to fetch data to be transmitted on the application's channel, and what the associated addresses are in the memory space of the destination application(s). For each channel, the BICs 108 and 110 contain a separate set of registers that allow the source-application 172 to initialize the source and destination address of data item to be transmitted on the bus 106.

This register space-partitioning process is controlled and protected by the host's MMU function, such that a source-application can only write to the BIC-registers dedicated to the channel-number associated with that application.

As shown in FIG. 5, the time and space-partitioning of the bus resources are consistent with the partitioning of other resources of the processing node. This creates a chain of partitioned resources that appears as a dedicated single-thread to each end-to-end application function.

Fault Tolerance

To achieve high availability at system level, the backplane databus sub-system is fault tolerant; that is, able to sustain one or more specified faults in a way that is transparent to the users of the transmission path. This fault tolerance is achieved by adding and managing redundant resources. The backplane bus system utilizes two forms of redundancy:

1. physical: there are four data bus lines as shown at 106, configured as two pairs, and
2. information: each data message on each bus line contains an Error Detection Code (EDC) checksum, of any suitable type known to those of skill in the art, to enable all receiving nodes 100 to detect corruption of the messages.

The fault tolerance is such that the bus 106 is able to operate down to a minimum of one valid data line from each line-pair.

The redundancy management comprises the following processes: fault detection, fault isolation and fault masking.

Fault detection is based on the premise that under no-fault conditions, identical copies of the transferred message are received simultaneously on all four data lines of the bus 106. Hence, the BIC pair 108 and 110 in each receiving node 100 (e.g., all nodes whose BIC-pair is synchronized to the bus) shall perform a pairwise comparison of the four received copies. Inconsistent comparison results are interpreted as a fault of the BIC hardware 108 or 110. In addition, each BIC pair 108 and 110 calculates the EDC checksum for each received message, and compare it against the EDC that was received as part of that message.

Fault isolation is performed by interpreting the results from the above fault detection process. A message that fails the EDC check is declared invalid. Inconclusive comparison results cause all four copies of the received message to be declared invalid.

BIC-faults are automatically isolated to the BIC 108 or 110, and also cause all four copies of the received message to be declared invalid. The fault detection and isolation process is such that there is either no valid copy of the message, or at least one from each bus line pair.

Fault masking can be done by only selecting one of the valid copies of a received message. If there is no valid copy, no message is selected to be transferred to the node's user application partition(s).

Thus, the BICs 108 and 110 provide a fail-passive connection to the bus 106. The loss of a BIC 108 or 110 means the loss of the connectivity of its node to the bus. If one or more of the application functions of this node 100 need to be fault tolerant, then preferably a redundant node 100 is used.

Fault Containment

Fault containment is the result of the specified time and space partitioning, resource redundancy and management, and of physical and electrical separation of system resources.

Due to the dual-BIC architecture and the time table 180 driven protocol as described above, there are no single faults that can cause a node 100 to fail such that it transmits on the data bus 106 during a time-slot that is allocated to an other node. Each node 100 (including the BICs 108 and 110) is either fail-passive to single faults (the node does not transmit), or the fault is contained within time-slots during which the node is allowed to transmit.

As a result, unauthorized activity on the bus 106 can only take place if both of a node's BICs 108 and 110 and their associated components such as the line drivers 124 and 126, the table memories 112 and 114, and the clocks 130 and 132 fail in such a manner that: the drivers of at least one BIC are enabled by the other BIC outside the allocated time-slots, and the prior BIC actually activates its drivers at the same time (e.g., also outside the allocated time-slots)

This type of failure would require multiple, independent but simultaneous faults; their combined probability is extremely low. All other multiple node-faults result in the same behavior as single faults as described above (e.g., no transmission, or the fault is contained within the node's allocated time-slots).

In each node 100, the space-partitioning is controlled and protected by the Memory Management Unit functions of the host 102 and of the BICs 108 and 110, as described below. It prevents each application partition from:

1. writing data-to-be-transmitted in the memory space of an other application 172, and
2. initializing the BICs' registers that are allocated to an other application's transmission time-slots It also prevents the BICs from:

1. writing received data to the memory space of an application 172 that is not associated with that data's time-slot, and
2. fetching data-to-be-transmitted from the memory space of an application 172 that is not associated with the upcoming transmission time-slot Such partition-violation attempts are contained within the affected channel (the group of time-slots dedicated to the particular source-application).

Source-application faults, other than partition-violation attempts, result in erroneous data transfers to the associated destination applications in other nodes 100. However, this is contained within the address space of these source and destination applications.

Failure of a bus line driver 124 or 126 in a node 100, is contained to the connected bus line. A line-driver can fail "passive/off" or "active/on". Either mode affects the ability of that node 100 to transmit on the particular bus line. The "fail-active" mode also prevents other nodes from transferring data on the affected bus line. However, the bus 106 has dual-dual redundancy of bus lines. Hence, a line-driver's fail-active and fail-passive modes are masked by the redundancy management function in the receiving BICs 108 and 110. That is, these faults do not propagate beyond the receiving BICs 108 and 110. The line drivers 124 and 126 and bus coupling are specified to be of such a type (e.g., "DC-coupled with passive pull-up and open-collector") that none of the drivers are damaged, independent of the number of drivers that are active at any time.

Each node 100 has a bus line receiver, indicated by 140 and 142, for each of the 20 lines (4×4 data lines plus 1×4 clock lines) of the bus 106. The receivers 140 and 142 are shared by the node's BIC-pair 108 and 110. Like a line driver, a line receiver 140 or 142 can also fail "passive" or "active". A "passive" fault is contained within this node. It is masked by the BICs' redundancy management function. A receiver fault that is "active" on the BIC-side of the receiver has the same effect as a "passive" receiver fault. A receiver fault that is "active" on the bus line side of the receiver has the same effect as an "active" fault of line driver on that same bus line.

The four bus lines in the bus 106 are configured as two pairs Ax-Bx and Ay-By. Failure of a single bus line (e.g., open, short to ground or to the driver supply voltage) is masked by the redundancy management function in the receiving BICs 108 and 110. An "open" fault does not affect the transmission between two nodes that are on the same side of the "open". The bus 106 is fail-operational to a bridge between one bus line from each pair. A bridge between the bus lines of the same pair causes failure of the entire bus 106. This bus failure is "passive", in that the BICs 108 and 112 do not post any data received from the failed bus in the memory 120 of their host 102. Each bus line (including termination networks, connected transceivers, and ground plane) in the bus 106 preferably has a dedicated power supply, to prevent failure of any of these components to propagate to any of the other bus lines.

Test and Maintenance

The time-partitioning on the bus depends on the time table memories 180 of the BICs 108 and 110 in each node of the system. These time table memories 180 are inaccessible to the hardware and software of the BIC's host processing entity 102. Reconfiguration of the bus frame sequence requires reprogramming of the time table 180 of all BICs 108 and 110 in the same system enclosure. Hence, BIC time table loading capability is provided. For this purpose, the BICs 108 and 110 are preferably connected to communications bus (not shown) that is separate from the bus 106. This special bus allows the tables 180 to be reprogrammed via a maintenance action that does not require the removal of any module. A separate maintenance bus is provided for the X-BICs 110 and for the Y-BICs 108. In the preferred embodiment, the IEEE Std 1149.5 "Module Test and Maintenance Bus (MTM-Bus) Protocol" is used for this purpose. This maintenance bus can also be used to support shop testing and maintenance.

PHYSICAL LAYER

Overview

Figure 6:
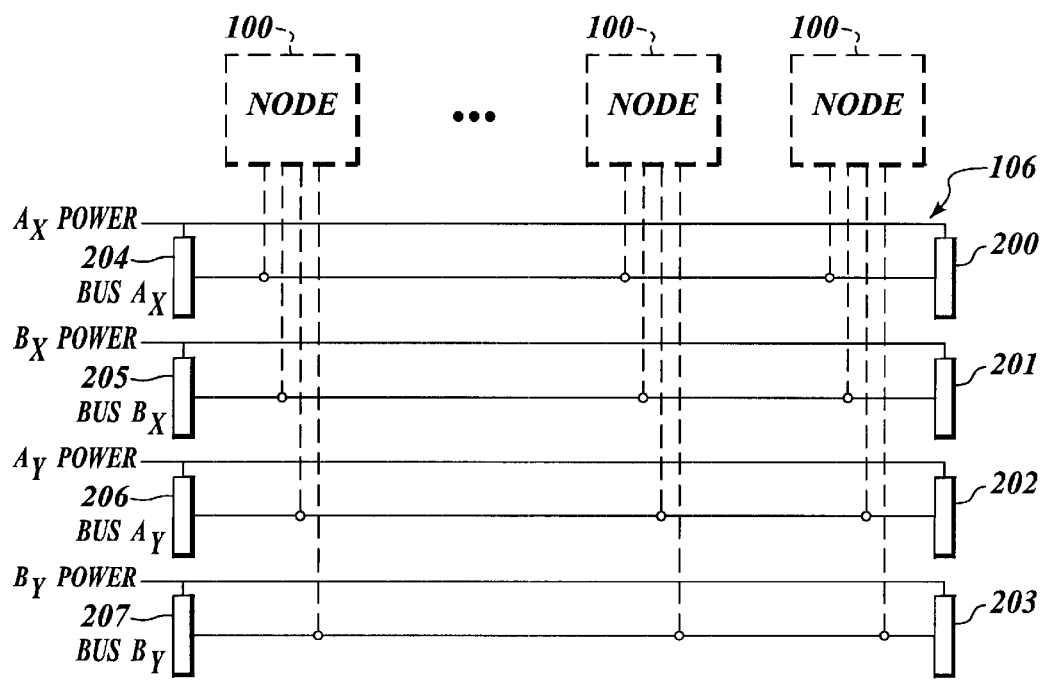
FIG. 6 is a diagram of a bus line configuration of the data bus system according to the invention.

As shown in FIG. 6, the backplane databus system is a multi-drop broadcast bus 106 that is time-multiplexed. Data is transferred in a serial manner. In one embodiment of the present invention, all electrical requirements and performance characteristics are met for a backplane databus of up to 12 inches (30 cm) in length, and accommodating up to 10 node interfaces 104. Other combinations of bus length and interface number are possible. Allowing up to 10 nodes 100 enables system configurations with, e.g., two dual processing modules, three standard I/O modules, 2 special I/O modules and 1 spare node (per system enclosure).

The bus 106 comprises four signal lines with associated terminators 200–207 consisting of four sub-busses: Ax, Bx, Ay, and By. Each sub-bus consists of four data lines (not shown) plus one clock line (not shown). Data is transferred in a serial manner on each data line. Data is transferred four bits at a time on each sub-bus of the backplane data bus 106, since each sub-bus comprises four data lines. Each transmitting node 100 provides the clock signals to go with the data it is transmitting. All receiving nodes 100 use these clock signals to clock in the data from the associated data lines. The clock lines are used for synchronization purposes.

Data Rate and Bus Throughput

According to one embodiment of the invention, the effective bus throughput on the bus 106 can be 2 million 32-bit messages each second, or 64 MBPS. This is accomplished with the use of the four parallel data lines per sub-bus, each running at 32 Mbps, and 50% message overhead. In this case, each 52-bit Data Block is transferred 4-bits parallel at a time, e.g., in 13 bit times. This is followed by an inter-message gap of 3 bit times. Out of the 13+3=16 bit times, 32/4=8 are used for data transfer. E.g., there is a 50% overhead that is used to transfer message validity status, a destination address label, an Error Detection Code, and the inter-message gap. Also, there can be 10,000 message times-slots per 5 msec Minor Frame. E.g., 200×10,000 time-slots per second. Each time-slot transfers one message. In addition, one out of every 10,000 message time-slots is dedicated to the transmission of a synchronization pulse, and there is a small number of pre-allocated time-slots for bus house keeping etc.

Data Bus Coupling

Each node 100 connects to the bus with four transceivers, for example 124,126, 140 and 142. Each transceiver interfaces to only one of the individual bus lines. Inside each node, there are two independent BICs: BIC-x 110 and BIC-y 108. Each BIC receives data from all four bus lines. BIC-x transmits only on the "x" bus lines and BIC-y transmits only on the "y" lines. The bus transceivers are coupled to the data bus lines in a manner that allows "wire-OR-ing" of signals without damage to any of the connected line drivers and receivers. The bus synchronization scheme depends on wire-OR-ing to detect sync pulse patterns, as described below. This can be accomplished through DC-coupling with Open-Collector drivers onto a bus line with passive pull-ups.

Bus Line Enabling

Figure 7:
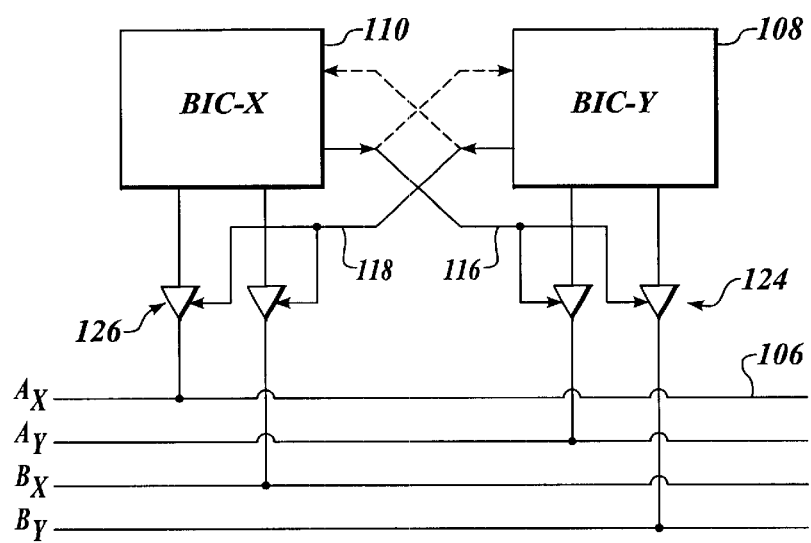
FIG. 7 is a block diagram of a bus interface driver enable circuit for two bus interface controllers according to the invention.

As shown in FIG. 7, in each node 100, the drivers 126 for the data and clock lines of sub-busses Ax and Bx can be enabled for transmission by the Y-BIC 108 via the enable line 118. Likewise, the drivers 124 for sub-busses Ay and By can be enabled by the X-BIC 110 via the enable line 116. This cross-enabling mechanism prevents a BIC 108 or 110 from actually outputting signals onto its bus lines if the opposite BIC does not agree that transmission should take place. It is a prime protection mechanism against violation of time partitioning on the data bus 106.

Request-To-Transmit Assertion

Each BIC 108 or 110 can assert a request to transmit (RTT) signal to the opposite BIC, upon determining that the transmission of a message must be initiated. As soon as the RTT from both the local and from the opposite BIC is present, each BIC 108 and 110 will assert its Transmit-Enable. Timing of the RTT-assertion should be such that it does not overlap with the latest time at which the Transmit Enables associated with the preceding time-slot can be released (whether from the own node or from an other node). If the BIC-status is "In Sync", and the RTT from the opposite BIC is not received within four BIC-clock cycles upon local RTT-assertion, then RTT shall be released, and the BIC shall change to the "out-of-sync" state. This forces the BIC to enter the frame level (re-) synchronization process to regain synchronization. The exchange and AND-ing of RTTs synchronizes the transmitting BIC-pair 108 and 110 to within one BIC-clock cycle.

Data Clocking

Each of the four sub-busses in the data bus 106 consists of one clock line and multiple parallel data lines as described above. The transmitting node 100 shall transmit a clock signal on the clock line of each sub-bus in unison with the data bits on the associated data line(s); the associated data bits shall only be changed on the falling edge of those bus clock signals. All receiving nodes 100 shall clock data into their receivers 140 and 142 on the rising edge of the received clock signal. The timing of the bus clock signals is such that the receiving BIC clocks in the bus data close to the middle of each data bit.

BIC Clock Accuracy

Each of the BICs 108 and 110 has its own local clock oscillator 130 and 132 respectively. Preferably the BIC clocks 130 and 132 will have an accuracy such that any two of the clock oscillators cannot drift apart by more than one nominal period of the local oscillator clock, measured over a time period of 16 transmission time-slots. The BICs 108 and 110 can derive its data and clock line signals from their local oscillators. In this arrangement it is assumed that a message transmission will take place at least every 16 time-slots; the bus interface and protocol is specified such that all non-failed synchronized nodes transmit either a data message or an idle message during each of their allocated time-slots. Also, each oscillator is only allowed to cause half of the allowed drift; given 16 bits message duration (52 bits transmitted 4 at a time, plus 3-bit gap time), the required clock tolerance over time and temperature would be:

$$\frac{1}{2} \cdot \frac{1}{16 \text{ messages} \times (52/4 + 3) \text{ bit times}} \cdot \frac{1}{r},$$

where $1/r$ is the ratio of the BIC's local clock oscillator frequency and the bit rate on a single data or clock line. E.g., for a data rate of 32 MBPS and an oscillator frequency of 64 MHz, $1/r=1/2$, and the desired BIC clock tolerance is 975 PPM.

Bus Transceiver Enabling

In each node 100, the drivers 126 for bus lines Ax and Bx are enabled for transmission by the Y-BIC 108. Likewise, the transceivers 140 for bus lines Ay and By shall be enabled by the X-BIC 110.

Test & Maintenance Bus Lines

Preferably, the backplane bus system further includes two Test-and-Maintenance (T&M) buses: the T&M X-bus and Y-bus (not shown). The purpose of these buses is to enable re-programming of the time table memory 180 of the BICs 108 and 110 in each node 100. The T&M X-bus shall be connected to the X-BICs 110, the Y-bus to the Y-BICs 108. In a preferred embodiment, these buses are compliant with IEEE Standard 1149.5 "Module Test and Maintenance Bus (MTM-Bus) Protocol". An IEEE 1149.5 T&M bus comprises five signal lines for data, control, and clocking: Control (MCTL), Master Data (MMD), Slave Data, (MSD), Pause Request (MPR), and Clock.

Data Bus Power Distribution

Power is preferably supplied to the following bus elements:

1. the four transceivers in each node 100,
2. the termination network(s) of each of the four databus signal lines, and
3. the transceivers and terminators of the two Test and Maintenance buses.

Transceiver Power Lines

As indicated above, each node 100 contains a separate transceiver for each of the four data bus lines (Ax, Bx, Ay, By). All bus line transceivers should be powered by the local node. Distribution of this bus line power within each node should be such that no single fault within the node 100 can cause active failure of the signals lines of multiple sub-busses.

Bus Line Terminator Power

Figure 8:
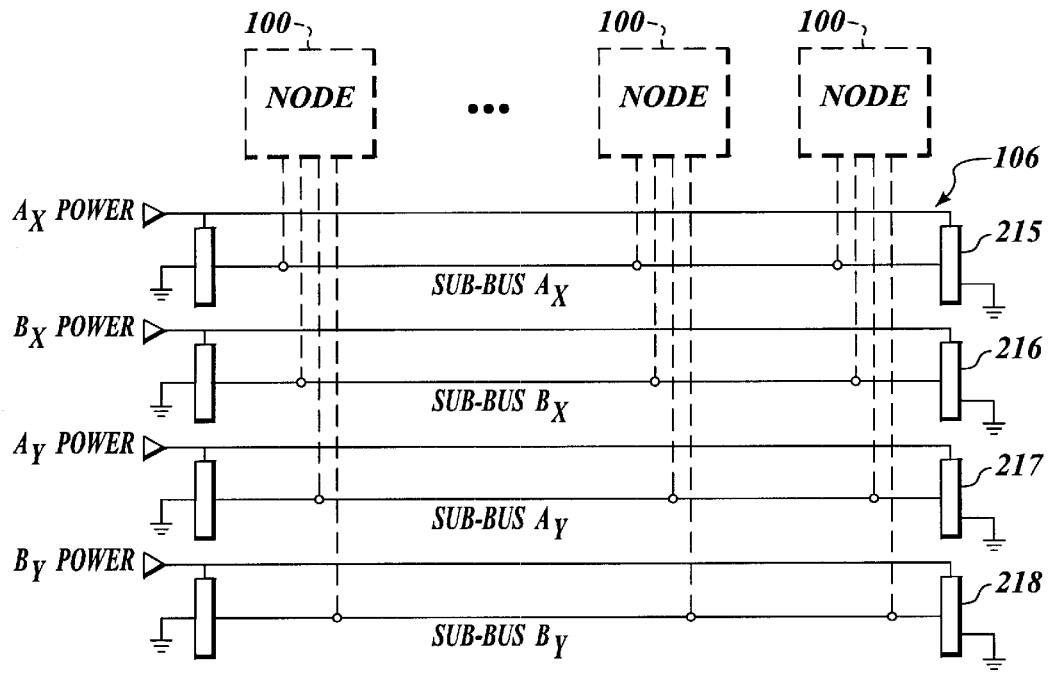
FIG. 8 is a diagram of a bus line power distribution circuit of the data bus system according to the invention.

As shown in FIG. 8, the preferred embodiment of the invention, includes a separate power source 215–218 for termination networks of each of the four databus lines. It is desirable to have four independent power sources, so that a single fault in the power sources and power distribution cannot affect multiple sub-busses. There are no cross-connections between the termination power 215–218 of one bus line, and the termination or transceiver power 210–213 of any other databus line. Conversely, any particular bus is allowed to have the same power supply for its transceivers and terminators.

Test & Maintenance Bus Power Lines

The power supply for the line transceivers and termination of the X-bus are independent of that for the Y-bus, but may be the same as one for either the Ax or the Bx databus. Similarly, the Y-bus power may come from the supply that powers either the Ay or the By databus.

Signal Encoding

Preferably, the signals on data lines are NRZ encoded. With the NRZ (Non-Return-to-Zero) format, the bus line signal is "high" during each entire "1" in the transmitted data, and "low" during each entire "0". That is, the signal only changes state when the data changes, and has the same number of transitions as the data stream to be transmitted. This straightforward scheme also simplifies encoding and decoding. A small number of transitions per bit also reduces the potential of generating EMI.

Data Encoding

As previously indicated, the backplane data bus 106 includes four data lines, labeled Ax, Bx, Ay, By. Data that is transmitted on these buses are encoded as follows:

Ax: normal data levels,

Bx: inverted data levels (logical 1 has inverse level from logical 1 on bus line Ax), Ay: normal data levels, By: inverted data levels.

Preferably, all the BICs 108 and 110 will decode received data before performing the voting process as is described below.

Error Detection Encoding

A 4-bit Error Detection Code (EDC) checksum is appended to all Messages. The EDC enables all receiving nodes to determine completeness and integrity of the received data. The encoding algorithm is preferably such that it allows the following detection coverage:

100% of single-bit errors,

100% of two-bit errors,

100% of odd-number-of-bit errors, not less than $(\frac{1}{2})^k \times 100\%$ of burst errors, where k is the size of the burst.

In the preferred embodiment of the invention, if all fields of the message consist of all zeroes, then the EDC encoding algorithm shall produce a checksum that is non-zero. The purpose of the latter requirement is to enable the BIC to detect synchronization pulses. The sync pulses consist of all-ones and are not to be confused with data messages.

BIC Table Memory

As discussed above, each of the BICs 108 and 110 has its own independent table memory 112 or 114. Table memories 112 and 114 contain all information necessary and sufficient for the BIC to perform the following functions:

1. time-partitioning (only the designated node can transmit during a time-slot), and
2. space-partitioning (a Memory Management Unit function to guarantee that the BIC 108 or 112 can only fetch data from, or write data to the designated host-memory partition that is associated with the time-slot).

The table memories 112 and 114 include two separate and independent sub-memories:

1. Time table Memory 180, dedicated to the time-partitioning function. This memory should be non-volatile, and only be loadable via a maintenance action. In the preferred embodiment, the host 102 has no access to this sub-memory.
2. Space table Memory 170, dedicated to the space-partitioning function. This memory is loaded by the host's Operating System Kernel.

Time Table Contents

Figure 9:
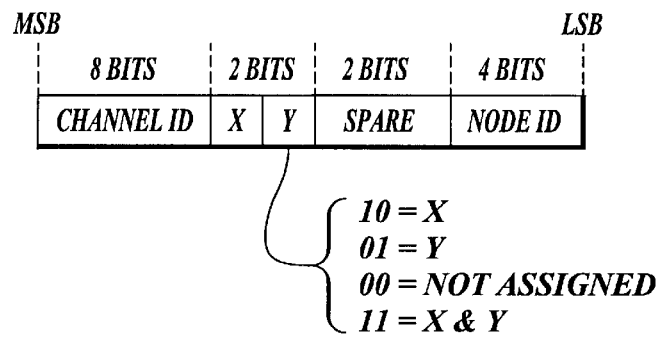
FIG. 9 is a diagram of a time table entry format for a time table for use with the bus interface controllers of the data bus system according to the invention.

FIG. 9 provides an example of the time table 180 entry format. All nodes 100 have the same time table 180. The time tables 180 preferably will contain a single fixed sequence of transmission related information for each of the time-slots that make up a Minor Frame:

1. which node has the exclusive permission to transmit,
2. whether the data-to-be-transmitted is to be obtained only from the host processing element associated with the X-BIC, only from the Y-BIC's host, or from both.
3. identification of which of up to 256 Channels this time-slot belongs. A time-slot shall not be assigned to more than one Channel. Each Channel shall be exclusively dedicated to only one node for transmission.

The last time-slot of the Major Frame shall not be assigned to any node for data transmission. It is reserved for transmission of the synchronization pulse. Each transmission frame (Minor Frame) consists of 10,000 time-slots; slot No. 9,999 is not available for data transmission, since it is reserved for transmission of the synchronization pulse. However, synchronization is done once per second, e.g., once every 200 Minor Frames. So, this reserved time-slot will only be used once every 200 times. If data-to-be-transmitted is only fetched from a single-source host 102 (either X or Y), the fetching BIC 108 or 110 transfers that data to the opposite BIC for simultaneous transmission. If the data-to-be-transmitted is fetched from both hosts 102 in the node, then both BICs 108 and 110 exchange their fetched data and compare it prior to transmission.

Each of the table entries shall contain 16-bits of information: an 8 bit channel-ID, 2 bit data source ID, 2 spare bits, and 4 bits transmitting node ID as shown if FIG. 9. It should be noted that the table memory 180 need not be 16 bit wide; e.g., each table entry could be located at two consecutive 8 bit wide addresses.

Space Table Contents

As indicated above, each node 100 will have at least one node-specific space table 170 associated with the BICs 108 and 110 for that node. For each of up to 256 Channels, the space table will contain the following information:

1. If the node 100 is the designated transmitter on a channel, as indicated by the time table 180: the boundaries of the partition in the host processing entity's memory 120 where the BIC 108 or 110 is to fetch data to be transmitted;
2. If the node 100 is the designated transmitter on a channel, and the transmission is "dual host" as shown in FIG. 4: the maximum period for which the BIC 108 or 112 may wait for the opposite BIC to also be initialized for transmission.
3. A flag that indicates whether data that is received and validated on the channel, is to be passed on to the Host's memory 120 (e.g., whether there is a destination application partition in this node). If so, the boundaries of the partition in the Host's memory 120 where the BIC is to write this validated data.

The space table 170 can accommodate different source and destination memory partitions for the same channel. The BICs 108 and 110 should have "read-only" access to the space table 170. The BICs' maximum waiting period for dual-host operation shall be expressed in predetermined units. It should be noted that the memory partition boundaries could be given in the form of a page or segment base address and an upper address limit. This upper limit may be the upper address of a memory partition consisting of multiple, contiguous pages. Also all BICs 108 and 110 receive and validate all data transmitted on the bus 106, including the node's transmission wrap-around. The wrap-around mechanism may also be used to pass data between application partitions on the same node. Hence, the space table entry that indicates whether to keep or discard received data, is independent of the node's permission to transmit on this channel.

Table Loading and Reconfiguration

The BICs 108 and 110 will have a communication port to the Test and Maintenance Bus, for the purpose updating the time table memory 180. Preferably a BIC 108 or 110 whose time table 180 is being (re-)loaded shall not be able to transmit on the bus 106 until the table update has been completed successfully. It should be noted that the time table can be located in a memory device with a built-in T&M port. In this case, this port would be used for table loading directly, rather than loading via the BIC's port. However, the BIC 108 or 110 still should not transmit during the time table update.

The time table 180 should only be alterable via a maintenance action. The host 102 should have no access to the time table 180 memory whatsoever. It should be noted that any re-distribution of a channel's time-slots within the Minor Frame, or re-allocation of a time-slot to a new or different channel implies the reprogramming of all time tables 180 of all nodes within the system.

The space table 170 should also be loaded into the BIC's memory 112 or 114 by the host's operating system kernel as part of the node's power-up/reset activities. The BIC 108 or 110 should also enable loading of the space table 170 during the first few seconds following power/up or reset. After that, initiation of table loading should be locked out, and the space table should become inaccessible to the host 102.

Table Compatibility

To ensure the time-partitioning on the bus 106, all nodes 100 should use the same time table 180 version. To this end, the time table memories 180 contain a predetermined location where the time table version is stored. As part of the initialization process, each BIC 108 and 110 reads and posts this version number in its Operational Status Register (not shown)that is accessible to the host 102 or 150 and 152. The nodes 100 should exchange their local time table version number via dedicated time-slots. There is one such time-slot for each of the nodes 100 in the system. This time-slot allocation is the same in all table-versions. It allows each node 100 to determine whether or not it has a time table version that is compatible with that of the of the other nodes on the bus 106. If a node 100 determines that it has an incompatible version, it should command its BIC-pair 108 and 110 to only transmit during version-independent time-slots and for synchronization. It should be noted that if both BICs 108 and 110 in one or more nodes 100 have a different time table version, they will transmit during time-slots that are allocated to one or more of the other nodes 100. However, the BICs 108 and 110 will still be able to synchronize to the bus 106, since all nodes 100 use the same time-slot for transmission of the sync message. Also, time-partitioning is retained if only one BIC 108 or 110 in a node 100 has a different time table 108 or 110: this BIC will disagree with its counterpart in the same node, and transmissions will not be enabled. Of course, this means that the node is effectively off-line. Further, assigning a version-independent time-slot to each node 100 ensures that the time table versions can be exchanged even if one or more nodes have the wrong version.

The local time table version should be transmitted by the node's BIC-pair 108 and 110 without involvement of the node's host(s) 102 or 150 and 152. This transmission shall be in the "dual-host" transmission mode as described above. The cross-node time table verification mechanism should be distributed between the BIC-pair 108 and 110 and the host(s) 150 and 152. In this case, each BIC 108 and 110 has its own time table 180 and associated Table Version. The autonomous "dual-host" transmission of this table version ensures that both BICs 108 and 110 of a pair have compatible tables, before they transmit on the bus 106.

Each source and destination application in the local node 100 has dedicated memory areas in the application memory 120 where the BIC 108 and 110 is allowed to fetch data to-be-transmitted, and post validated received data. The boundaries of these memory partitions are specified in the BICs' space table memory 170. This partitioning is strictly local, and there is no need for space table version management between nodes 100. However, the source and destination applications associated with each particular channel, should have a compatible interpretation of the data structure that is to appear in the destination address space. To ascertain this compatibility, such related applications can exchange a Data Structure Version number. Notably, this is in addition to fault avoidance measures such as ensuring that software for related source and destination applications is linked to the same data structure map, or uses the same data structure control document. Also it should be noted that incompatibility of data structure maps cannot cause violation of the time-partitioning on the bus 106, and cannot propagate beyond the affected channel.

BIC Initialization

The following steps are preferred for initialization of the BICs 108 and 110. Upon power-up/reset, each BIC 108 and 110 should perform the following initialization activities:

1. do not access the DPRAM until the Host indicates that it has been cleared,
2. clear the BIC-internal registers for Operational Status, Transmission Status, Reception Status, and Host Command, and counters,
3. clear the receive buffers of the synchronization pulse detection to a value that cannot be mistaken for such a pulse,
4. verify the integrity of the time table memory 180 by performing a checksum verification,
5. post the time table version in the appropriate register for access by the Host,
6. verify the integrity of the BIC's Node Identification strapping,
7. start the synchronization process, and
8. wait for the space table memory 170 to be loaded by the BIC's host 102.

If the power-up/reset time table checksum verification fails, then the BIC 108 or 110 should enunciate this in its Operation Status register, and disable all data and synchronization message transmissions.

Physical and Electrical Separation

In the preferred embodiment it is desirable that redundant resources be properly separated to maintain the required time and space partitioning, for fault containment purposes, and to provide fault tolerance. This requires separation both on the bus 106 and of the BICs 108 and 110, and includes physical location, routing of bus lines, and electrical isolation of signals.

OPERATION OF THE DATA BUS SYSTEM

Bus Operation Overview

Operation of the preferred embodiment of the data bus system comprises three related processes:

1. synchronization,
2. transmission, and
3. reception.

As described above, transmission activity is organized into fixed-length cyclic frames. Each such frame comprises the same, fixed number of time-slots. All time-slots have the same length. A time-slot either contains a single fixed-format Message and an inter-message gap time, or is empty.

The last time-slot of each frame is dedicated to synchronization between the nodes; multiple nodes may transmit simultaneously during this time-slot. Each of the remaining time-slots in the frame is either dedicated to one particular transmitting node, or is not assigned at all (reserve for future growth). This assignment is programmed into the Table-Memory 180 of each BIC 108 and 110; hence, nodal access to the bus 106 for transmission is fully deterministic. Nodes 100 whose BICs 108 and 110 are in sync with the backplane, always transmit during assigned time-slots. They either transmit an idle message or an actual data message. Both messages have the same basic format.

Synchronization between nodes 100 is done at the beginning of each frame. The BICs 108 and 110 in each node 100 independently determine that it is time to transmit a sync message. This is basically a data message with a uniquebit pattern that looks like a sync pulse. Due to the nature of the bus (preferably DC-coupled with passive pull-up), the simultaneously transmitted sync pulses can be "wire-OR-ed". The trailing edge of the OR-ed pulse is the same for all nodes 100. This provides the synchronization, and causes all synchronized BICs 108 and 110 to be at the same point within the frame.

During each time-slot, the BICs 108 and 110 in each node 100 check their table memory 112 and 114 and determine if the upcoming time-slot belongs to a group of slots that are dedicated to the local node for transmission. If so, the BICs 108 and 110 fetch data from the memory partition of the application function that is associated with the particular time-slot. The memory partition limits are stored in the BICs' table memory 180; the actual address within the partition is found in a BIC register (not shown)that is dedicated to transmission related bookkeeping, and is initialized by the sending application. The same register contains the destination address for the particular data item. The fetched data and destination address are formatted into a message. The latter is serialized onto the four bus lines of the bus 106 by the node's BIC-pair 108 and 110 during the next time-slot.

All BICs 108 and 110 in all nodes 100 receive all transmitted messages. Each BIC 108 and 110 buffers the message bit-streams from the four data lines. The correctness of each copy of the message is determined by evaluating the error detection checksum that is part of the message, and by pair-wise comparisons of the four copies. If two or more of the copies are valid and identical, one of them is written to the destination address contained in the message. This address is referenced to the memory partition of the destination application 172 in the receiving node 100. The memory partition limits associated with the particular time-slot are stored in the BIC's space table memory 170.

Frame Organization and Message Format

Figure 10:
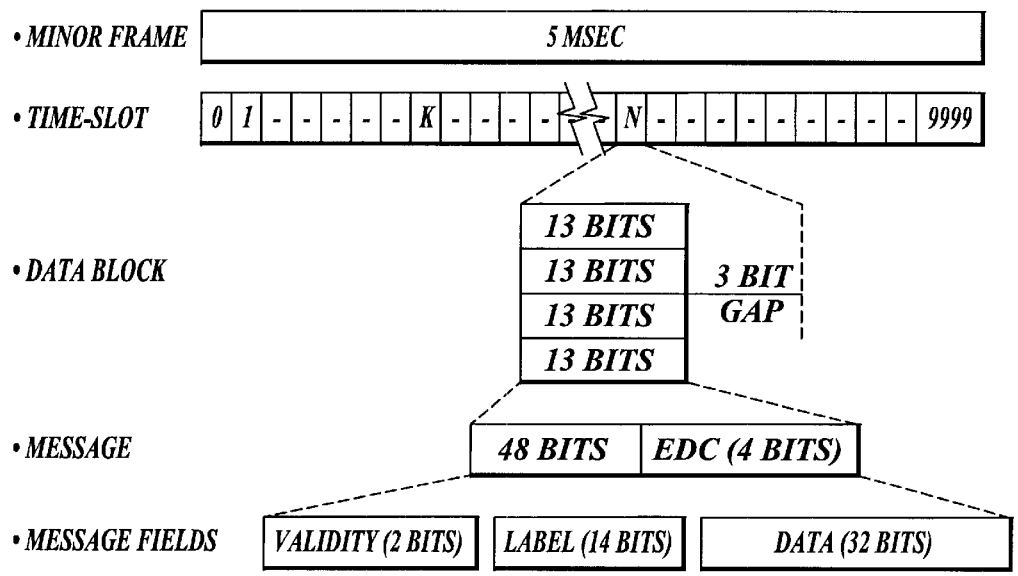
FIG. 10 is a diagram of a frame organization and message format for use with the data bus system according to the invention.

FIG. 10 illustrates the preferred embodiment of the frame organization and message format of the invention. Transmission activity on the bus 106 can be organized into cyclic Minor Frames of fixed length, consisting of 10,000 consecutive time-slots during which transmission may take place. All time-slots should accommodate a single fixed length Data Block (as defined below) and inter-message gap time as shown in FIG. 10.

The last time-slot of each Minor Frame (slot No. 9,999) should be reserved for transmission of the Synchronization Pulse. The Sync Pulse shall set the clock line "low" for a fixed time that is shorter than a time-slot, but long enough so as not to be confused with the Clock Preamble of a data message transmission. The Sync Pulse is transmitted on all four clock lines simultaneously. It should be noted that Slot No. 9,999 of each Minor Frame is reserved for synchronization, but is only used one out of every 200 Minor Frames (e.g., once per Major Frame). The remaining 199 reserved slots are not used; however, they could be used for data transfer, as long as it is guaranteed that no data-to-be-transmitted is lost during the 200$^{th}$ reserved slot. Also, the clock preamble is 1.5 bit times, and a time-slot lasts 52/4+3=16 bit times. So, a sync pulse pattern of 10 consecutive zeroes would suffice.

Each of the remaining time-slots not dedicated to synchronization, should be reserved for transmission of a single Data Block. A Data Block should be a 52-bit data string, comprising a 48-bit Message and a 4-bit Error Detection Code (EDC) checksum. The Message itself should consist of a 14-bit destination address field, a 32-bit data field, and a 2-bit message validity status field. Each data string shall be followed by an inter-message gap of 3 bit-times.

The BICs 108 and 110 can use the following (MSB, LSB) settings for the two validity bits:

00=Fault Warning (error)

01=Transmission Terminated (incomplete file transmission; data transmitted so far should be disregarded by the receiving nodes).

10=No Computed Data (idle message)

11=Normal operation (valid data)

In case of "Fault Warning", the databits of the message may contain additional details.

Figure 11:
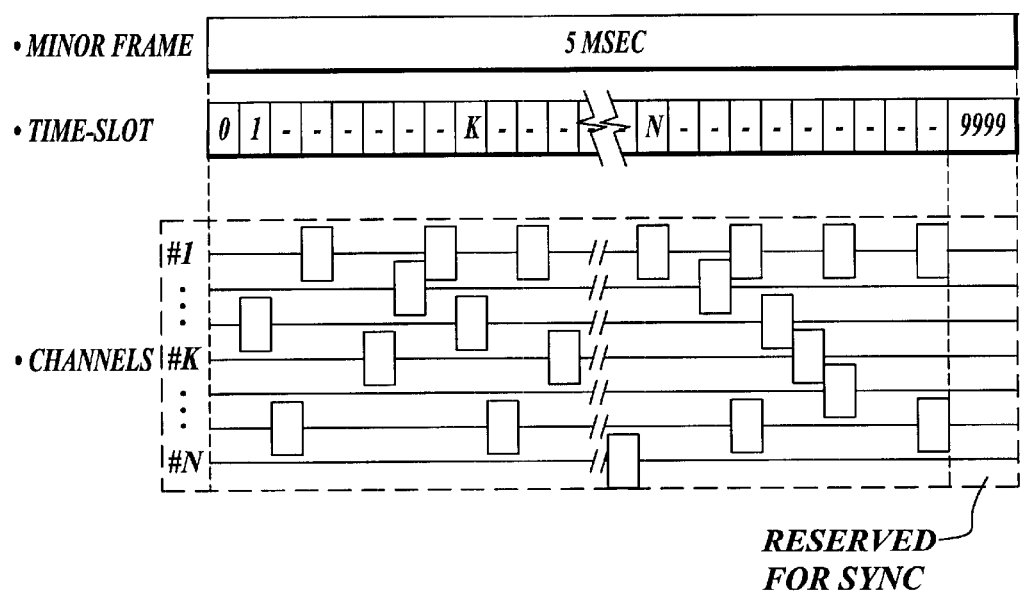
FIG. 11 is a diagram of a frame and channel grouping for use with the data bus system according to the invention.

FIG. 11 illustrates the preferred method of grouping the time slots into "Channels". As a shared resource, the bus 106 is the medium for semi-duplex communication between the connected input/output and processing nodes 100. The various application functions, resident in these nodes 100, require different amounts (both "peak" and "average") of the available bus throughput. This throughput should be allocated to the application functions, in the form of a predetermined number of time-slots that are distributed over the frame period. An application 172 can have one or more such groupings, of the same or of different size. Each of these groupings is referred to as a channel.

Each individual time-slot is either:

1. exclusively allocated to one particular source-application fiction (hence, to one particular transmitting node 100), or
2. not allocated at all (e.g., spare), or
3. allocated to all nodes 100 simultaneously, for transmission of the Sync Message (time-slot #0 only).

All time-slots of a particular channel are allocated to the same transmitting node 100. The above time-slot allocation is programmed into the time table memory 180 of all the BICs 108 and 110 in the system.

As can be seen from FIG. 11, time-slot #0 immediately follows the synchronization time-slot, and is not allocated to any channel. Formatting a message for transmission is done during the time-slot immediately preceding the one in which the message is actually to be transmitted, as will be described below.

There is one time-slot allocated to each of the nodes 100, to enable Time table version management. This allocation is independent of the Time table Version described previously. This allocation scheme is fully deterministic as to which node may transmit during a particular time-slot, thus providing time partitioning. Protection against violation of this partitioning is provided by the dual-BIC architecture: both BICs 108 and 110 of a node independently determine for each time-slot whether the node 100 is allowed to transmit, and, if so, cross-enable each other's bus line drivers 124 and 126. Memory space partitioning is provided by associating a predetermined application memory section with each channel. This is "source memory space" for a transmitting node, and "destination memory space" in receiving nodes. This partitioning is protected by the Memory Management Unit function of the BICs 108 and 110.

Support for Dynamic System-Reconfiguration

The fault-tolerance scheme at the system level may require the migration of an application function from one processing node 100 to an other. This requires the associated data transmissions to migrate as well. The assignment of channels to nodes 100 is predetermined, and captured in the time tables memories 180. There is only one mapping of time-slots to channels and nodes 100, thus, there is no dynamic reconfiguration of the time table 180, and channels should not migrate with application functions. To enable system reconfiguration, one or more "back-up" channels can be dedicated to the node 100 in which a migrating application function may be activated. This channel allocation should have the same number of time-slots as allocated to that application function in the "primary" node 100.

Synchronization

To ensure time partitioning on the backplane bus 106, all BIC-pairs 108,110 are synchronized. The synchronization scheme is "distributed". In other words, there is no central clock or similar single-point of failure.

Preferably there at least two levels of synchronization:
1. at frame level (between BIC-pairs 108 and 110), and
2. at message level (each BIC-pair to incoming data messages, and between the BICs of each pair for message transmission)

Frame level synchronization ensures that the BICs 108 and 110 achieve, maintain, and regain synchronization as long as the clock line of a sufficient number of sub-buses are not-failed. The frame sync shall provide:
1. synchronization of all (healthy) BIC-pairs 108 and 110 after system wide loss of synchronization (upon system power-up, or after a massive disturbance),
2. re-synchronization of one or more BIC-pairs 108 and 110 to a group of BIC-pairs that are already in sync (e.g., a node that has dropped off-line).

Message level synchronization shall maintain synchronization of all nodes 100 despite drift between the clock oscillators 130 and 132 of the BICs 108 and 110.

Frame-level Synchronization

Frame-level synchronization of the BIC-pairs 108 and 110 is based on the transmission of a synchronization pulse during the last time-slot of the last Minor Frame of each Major Frame. All nodes 100 that are in the process of (re-)synchronizing, or that already are synchronized, send this pulse simultaneously. The BICs 108 and 110 in each node independently determine that is time to transmit the sync pulse. Each BIC-pair shall begin transmission of the sync pulse at the point that it believes the proper time slot begins, based on counting time-slots since the last pulse. Upon detection of the sync pulse, each BIC 108 and 110 shall reset its Major Frame timing, and repeat the (re-) synchronization process at the end of the subsequent Major Frame. A BIC-pair 108 and 110 that is out of sync, will wait at for an amount of time equal to a Major Frame, before asserting the sync pulse.

Synchronization Pulse Detection

To achieve and maintain frame-level synchronization, the nodes 100 transmit a Synchronization Pulse simultaneously on all four clock lines during the last time-slot of each Major Frame. All nodes 100 that are synchronized to the bus 106 (or attempting to synchronize) transmit the Sync Pulse simultaneously. The bus coupling allows wire-OR-ing of signals on each bus line. This allows the BICs 108 and 110 to use the trailing edge of the resulting OR-ed pulse as a reference point in time that is common to all nodes 100. In other words: to be synchronized to each other.

Because the nodes 100 are never perfectly synchronized, there will be a certain amount of inter-node skew at the beginning of the synchronization time-slot. The pulse will be first asserted by the "fastest" node. The trailing edge of the OR-ed pulse is determined by the node with the "slowest" BIC-pair. The OR-ed pulse can only be "stretched" too long by a node that has both of its BIC clocks 130 and 132 running unacceptably slow (e.g., two faults). If a sync pulse is asserted too soon, then the data time-slot immediately preceding the sync time-slot in the $200^{th}$ Minor Frame, will be stepped upon.

The BICs 108 and 110 will perform the synchronization pulse detection separately from the data message reception process. Each BIC 108 or 110 should continuously check all four clock lines independently for the Sync Pulse pattern. A Sync Pulse shall be valid, if the pattern is simultaneously found on at least two of the following sub-bus pairs: Ax-Ay, Ax-By, Bx-Ay, Bx-By. Occurrence within a predetermined number of cycles of the BIC clock shall be considered "simultaneous". Upon detection of a valid Sync Pulse, the BIC 108 or 110 will wait until all bus lines on which the pulse was detected, have returned to their inactive state. Upon detection of the trailing edge of the Sync Pulse, the BIC is "in sync", and shall reset its time-keeping to the beginning of the Major Frame.

Real-Time Clock Strobe

The X-BIC 110 asserts a Real-Time Clock strobe to its Host 102 as soon as the Synchronization Pulse Detection has detected the trailing edge of the Sync Pulse.

Message-level Synchronization

At the beginning of a time-slot in which a node 100 is to transmit, that node's BICs 108 and 110 shall assert a Request-To-Transmit signal(RTT) to each other. As soon both BICs have asserted their RTT, they are tightly synchronized for transmission, and shall enable each others bus line drivers 124 and 126, and output the actual messagebit stream onto the bus 106.

All transmitting BICs 108 and 110 send clock pulses on the clock lines, in unison with the message bits on the data lines. The first active clock signal at the beginning of a message, shall be longer than the assertions during the rest of the message transmission The Clock Preamble of the transmission should be long enough to distinguish it from those subsequent clock pulses. All receiving BICs 108 and 110 will use the transmission preamble to detect the beginning of a new incoming message. The received transmission preamble can also be used to re-synchronize the BIC clocks 130 and 132.

Loss of Synchronization

Each BIC 108 and 110 can change its status to "out-of-sync" under any of the following conditions:
1. upon power-up/reset and during subsequent initialization,
2. upon assertion of a Request-To-Transmit (RTT) to the opposite BIC, if the latter does not also assert its own RTT within 2 cycles of the BIC's local clock, and 3. if it is "in sync", and detects a valid Sync Pulse more than a predetermined number of local-clock cycles prior to the time at which the BIC 108 or 110 would have asserted its own Sync Pulse.

The sync status and "unexpected sync pulse" event shall be indicated in the Operational Status Register.

It should be noted that the BIC 108 or 110 need not take any action other than posting the unexpected sync pulse detection since it effectively re-syncs at the same time. A BIC 108 or 110 that is "out-of-sync" should enter the frame synchronization process, and search for a Sync Pulse to either regain synchronization, or establish initial synchronization. A BIC that is "out-of-sync" shall not transmit data onto the bus 106, nor perform redundancy management on data received from the bus. However, if the BIC 108 or 110 is "out-of-sync" it does not know the number or boundaries of the time-slots on the bus 106, and therefore cannot determine when to transmit data, or where to fetch or post received data from/to the host's memory 120.

Operational Status Annunciation

It is also desirable that the BIC 108 and 110 shall contain an Operational Status Register where the following status information shall be posted:

1. Time table memory checksum test result,
2. Time table version,
3. Space table (not)loaded,
4. node-ID parity check result,
5. initializing/initialization completed,
6. in-sync/out-of-sync,
7. unexpected sync pulse detected,
8. connected/disconnected,
9. cross-BIC Transmission-Enable fault.

Each of the status flags in the Operational Status Register should be updated as soon as the associated status has changed. The host 102 should have read-only access to the Operational Status Register.

Message Transmission

Figure 12:
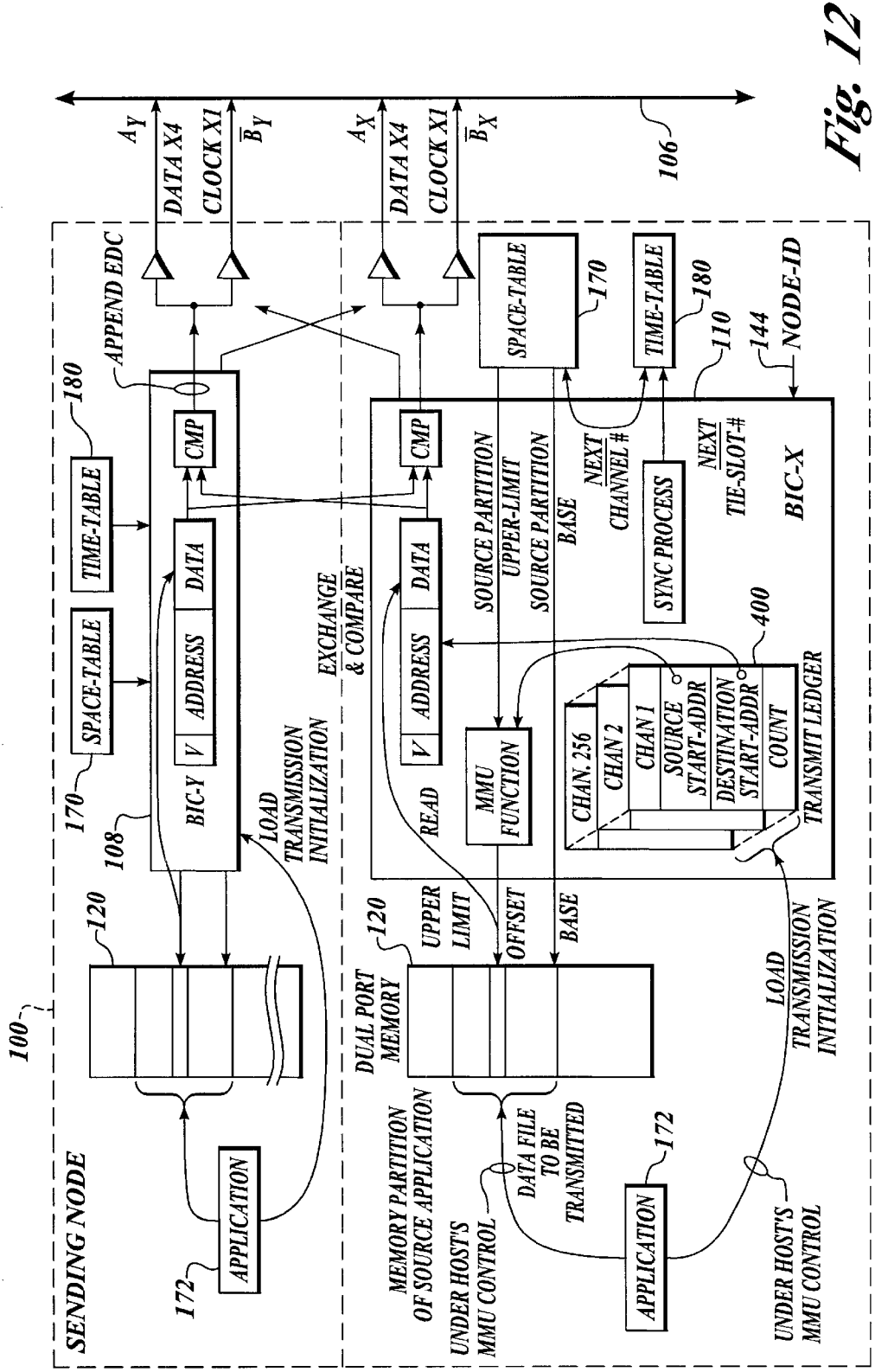
FIG. 12 is a state diagram illustrating the process of data transmission in the two processor data bus system of FIG. 4.
Figure 13:
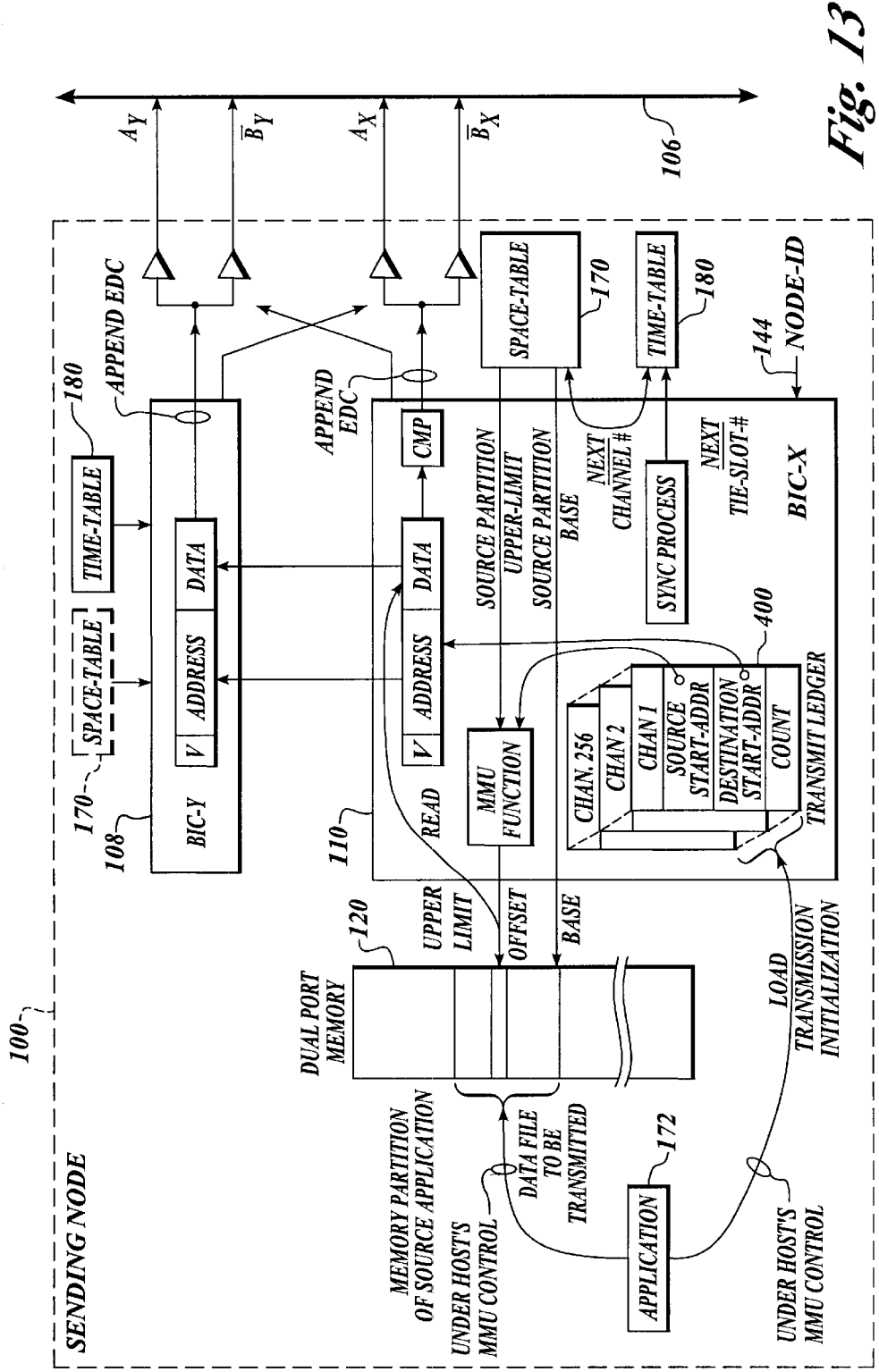
FIG. 13 is a state diagram illustrating the process of data transmission in the single processor data bus system of FIG. 2.

With reference to the state diagrams of FIGS. 12 and 13 the preferred method of message transmission in the data bus system of the invention will be generally described.

This process comprises two main parts:

1. initialization (set-up) by an application function of the host 102 or 150 and 152, and
2. execution by the BIC-pair 108 and 110.

Message transmissions are controlled based on the time table 180 and a transmission ledger 400 in the BICs 108 and 110 shown in FIGS. 12 and 13. The transmission ledger 400 is a set of BIC-accessible registers or memory locations for each of the up to 256 different Channels. They are dedicated to initialization and "bookkeeping" of the message transmissions. For each Channel, the transmission ledger 400 will contain registers for the following parameters:

1. the source-address of the data item to be transmitted next,
2. the destination-address of that data item,
3. the word count of data items still left in the file, including the current data item, and
4. a continue flag, that indicates whether there is an other file of contiguous data items to be transmitted upon completion of the current file.

The "continue flag" makes it possible to initiate transmission of several data blocks of contiguous data, without the blocks themselves having to be contiguous (back-to-back).

The transmission ledger 400 registers should accommodate the 14-bit size of the address field in the Message format. The source-address in a Channel Program shall be referenced to the base address of the source-application's memory partition for the particular transmission Channel. Likewise, the destination-address shall be referenced to the base address of the destination-application's memory partition for this Channel. It should be noted that if a data item has destination applications in multiple nodes 100, the same destination-address is used by all recipients; however, they may have different memory partition allocations. Also the data file can be as small as a single data item and if the data file contains more than $2^{14}$ items, not all of them will be transmitted. In general, the source and destination address will be different.

Upon placing the data file in its transmit memory partition, the source-application shall initialize the Channel's Ledger registers 400 with the source and destination address of the first data item in the file, and the size of the file. Each of the applications 172 should only have write-access to the ledger registers of its own transmit Channel(s). This should be under control of the Host's Memory Management Unit function, or equivalent thereof.

The BIC's Memory Management Unit (MMU) function prevents the data-fetch from accessing a memory location outside the source-application's partition for the particular transmission Channel. The BIC 110 shall use the space table 170 to map the Channel-number to the associated memory partition limits. If the BIC's MMU function determines that a source-address is out-of-bounds, then the BIC 110 will:

1. terminate transmission the remaining data items of the current file.
2. flag a "source-address boundary violation attempt" in the Transmission Status register of that Channel,
3. transmit a message with a predetermined bit pattern for the address and data field, and validity flags set to "Error".

The bit pattern of the address and data field of the error message is arbitrary; however, it must be ensured that both BICs 108 and 110 transmit the same pattern. Therefore, a fixed, predetermined pattern is used.

Before transmission can take place, the application 172 that sources the data shall place its data at consecutive locations in the memory partition that is allocated to this application for data transmission on the particular Channel. The application 172 should ensure that these locations are not in use by a file transmission that is currently in progress, prior to loading the data. Next, the application should load the transmission parameters associated with this file, into the Channel's transmit ledger 400. The application should ensure that the ledger registers are not in use by a file transmission that is currently in progress, prior to loading the parameters.

Each BIC 108 and 110 should be able to operate in two source-modes: dual-host, as shown in FIG. 12, and single-host, as shown in FIG. 13. For each transmission, the BICs 108 and 110 will operate in the source-mode specified in the time table 180 for the associated time-slot. In the dual-host mode, each BIC 108 and 110 obtains data-to-be-transmitted from its own host processor 150 or 152. E.g., the X-Host 152 generates data for the X-BIC 110, and the Y-Host 150 for the Y-BIC 108. Before transmission, the BICs 108 and 110 should exchange each formatted message and cross-compare. In the dual-host mode, a message shall only be transmitted if the exchanged X and Y-messages are identical.

In the single-host mode, only one BIC 108 or 110 of a pair is initialized by, and receives data-to-be-transmitted from its own host processor 102. That BIC formats the message and transfers it to the opposite BIC. Hence, "single host" can be "X-host" or "Y-host". From the BIC perspective, this means "local BIC host" or "opposite BIC host" (each BIC 108 and 110 has XY identification as part of the Node-ID strapping). It should be noted that all time-slots belonging to the same channel, should have the same XY source setting in the time table 180. Also, "dual host" operation is based on both X and Y hosts 152 and 150 preparing identical data for transmission. For this to work, the same application must be running concurrently on both hosts.

Before each new time-slot, the BIC 108 or 110 should check the time table 180 to determine whether the local node is to transmit in that time-slot, and if so, determine whether the transmission is "dual host", "local BIC host" or "opposite BIC host". If not, no transmission related actions need be performed for that time-slot.

Both single-host and dual-host transmission requires the transfer of data between the BICs of the transmitting BIC-pair. The BICs 108 and 110 shall exchange data-to-be-transmitted via a bi-directional datalink that is one or more bits wide, and has a clock line in each direction.

Dual-Host Transmission

In connection with FIG. 12, the "dual host" transmission will be described below in more detail. In this process the BIC 108 or 110 will:

1. determine to which Channel that time-slot belongs,
2. check this Channel's registers in the transmission ledger,
3. if the "count" register is not zero, then format the Data Block:
   a. fetch the data from the current source-address indicated in the Ledger register,
   b. append the current destination-address (as indicated in the ledger register),
   c. append the validity flags (set to "Normal Operation").
   d. transfer this concatenated data string to the opposite BIC, and
   e. receive like data string from the opposite BIC.
   if the "local" and "opposite" strings are identical then:
   a. set the validity flags to "Normal Operation"
   b. calculate and append the Error Detection Code (EDC) checksum and
   c. serialize the complete Data Block onto the bus during the appropriate time-slot.
   if the "local" and "opposite" strings are not identical then:
   a. set the validity flags to "Fault Warning",
   b. set the address and data field of the message to a predetermined bit pattern,
   c. calculate and append the Error Detection Code (EDC) checksum,
   d. output the message onto the bus,
   e. flag a dual-host data-miscompare fault in the Transmission Status Register, and
   f. terminate transmission of the remaining data items of the current file.
   if the "count" register is zero, then:
   a. set the validity flags to "No Computed Data",
   b. set the address and data field of the message to a predetermined bit pattern,
   c . calculate and append the Error Detection Code (EDC) checksum, and
   d. output the message onto the bus.

Terminating the transmission of remaining data items of the current file can be accomplished by forcing the "count" register in the Channel's Transmission Ledger to zero. Also, the BIC performs the transmission sequences in parallel with processing the data streams received during the same time-slot.

In dual-host operation of FIG. 12, the application that sources the data is running concurrently in both hosts 150 and 152 of the node. The dual-host transmission scheme can handle differences in the times at which each host completes its initialization of a file transmission, in order to accommodate hosts that are not perfectly synchronized (e.g., down to clock level). The dual-host scheme can apply a limited waiting period. During this waiting period, the BIC 108 or 110 that has already been initialized (e.g., the waiting BIC) will transmit Idle Messages on the affected Channel, instead of the data items already set up by its host. The maximum dual-host mode waiting time can be specified in the space table 170, for each Channel on which the local node transmits in that mode. If the dual-host mode waiting period expires without the opposite BIC being initialized, the BIC shall flag a "dual-host time-out" fault in the Transmission Status Register of the affected Channel, and transmit the Error Message. The BICs 108 and 110 will exchange their readiness for dual-host transmission of a new file.

Single-Host Transmission

In connection with FIG. 13, the "single host" transmission will be described below in more detail. If the BIC 108 or 110 determines that the transmission is "single host", and the host 102 belongs to the local BIC (e.g., the BIC is X-BIC and transmission is X-Host, or, conversely Y-BIC and Y-Host), the BIC shall:

1. determine to which channel that time-slot belongs,
2. check this channel's registers in the Transmission Ledger 400,
3. if the "count" register is not zero, then format the Data Block:
   a. fetch the data from the current source-address indicated in the Ledger register,
   b. append the current destination-address (as indicated in the Ledger register),
   c. append the validity flags (set to "Normal Operation"),
   d. transfer this concatenated data string to the opposite BIC,
   e. calculate and append the Error Detection Code (EDC) checksum, and
   f. serialize the complete Data Block onto the bus during the appropriate time-slot.
4. if the "count" register is zero, then:
   a. set the validity flags to "No Computed Data",
   b. set the address and data field of the message to a predeterminedbit pattern,
   c. transfer this concatenated data string to the opposite BIC
   d. calculate and append the Error Detection Code (EDC) checksum.
   e. output the message onto the bus.

On the other hand, if the BIC 108 or 110 determines that the transmission is "single host", but the host belongs to the opposite BIC (e.g., the BIC is X-BIC 110 and transmission is Y-Host 150, or, conversely Y-BIC 108 and X-Host 152), the BIC will:

1. fetch the data (validity bits, address field, data bits) from cross-BIC communication link,
2. calculate and append the Error Detection Code (EDC) checksum, and
3. serialize the complete Data Block onto the bus during the appropriate time-slot.

Idle-Message Transmission

The BIC 108 or 110 transmits an Idle-Message in the following cases:

1. the current Time-Slot is part of a channel that is assigned to this node 100 for transmission, but the associated application function has not prepared data to-be-transmitted (number of data items to be transmitted is at zero in the channel's transmit ledger registers).
2. the BIC is in dual-host operation and has been initialized by the host for transmission of a new file, but the opposite BIC has not yet been initialized.
3. the BIC-status is "in sync", but the BIC's space table memory has not yet been loaded.

Request-To-Transmit Assertion

Each BIC 108 and 110 asserts the Request-To-Transmit (RTT) signal to the opposite BIC, upon determining that the transmission of a message must be initiated. As soon as the RTT from both the local and from the opposite BIC is present, each BIC asserts its Transmit-Enable.

Timing of the RTT-assertion is such that it does not overlap with the latest time at which the Transmit Enables associated with the preceding time-slot can be released (whether from the own node or from an other node).

If the BIC-status is "In Sync", and the RTT from the opposite BIC is not received within a predetermined number of BIC-clock cycles upon local RTT-assertion, then RTT shall be released, and the BIC changes to the "out-of-sync" state. This forces the BIC to enter the frame level (re-) synchronization process to regain synchronization. The exchange and AND-ing of RTTs synchronizes the transmitting BIC-pair to within one BIC-clock cycle.

Error Message Transmission

The BIC 108 or 110 will transmit an Error Message (validity bits set to "Fault Warning) in the following cases:
1. the source-address of the current message to-be-transmitted is outside the boundaries specified for that Channel in the space table 170,
2. the BIC has not been able to get timely access to the Host's memory 120 to fetch data to be transmitted, and
3. X vs. Y data miscompare in the "dual host" transmission mode.

Message Reception

Figure 14:
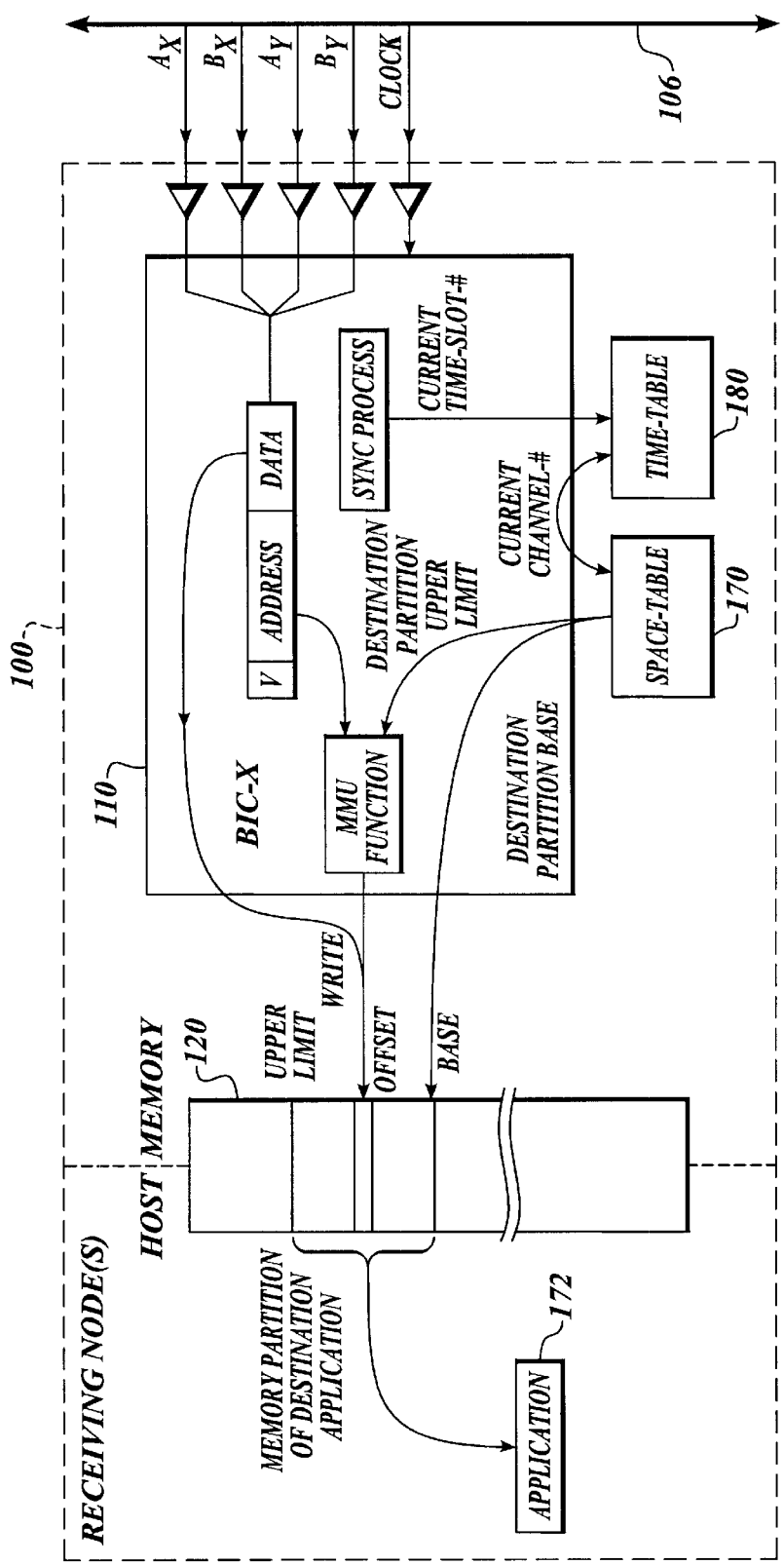
FIG. 14 is a state diagram illustrating the process of data reception in the single processor data bus system of FIG. 2.

FIG. 14 provides a state diagram illustrating the process of Message Reception. In the preferred embodiment of the invention Message Reception is a three-step process:
1. clocking-in the data streams from the four data lines of the bus 106,
2. performing Redundancy Management on the received Data Blocks, and
3. writing the data part of the selected, validated message to the appropriate location in the memory 120 of the host processing entity 102.

The result of the Redundancy Management is either an indication that the data is corrupted in an incorrigible manner, or the selection of a valid Message. Only messages that are valid will be written to the host memory 120.

The validated Message contains two validity flags. If the flag code in the validated Message is not set to "Normal Operation", then the BIC will discard the Message and terminate the reception process for this particular Message. If the validity flags are set to "Normal Operation", then the reception process shall proceed with determining where to write the data part of the Message.

The BIC's synchronization process keeps track of progression of time within the Major Frame, and shall indicate the number of the current time-slot. E.g., the number (0–9998) of the time-slot in which the validated Message is received. The BIC's time table 180 maps this time-slot number to the number of the associated data Channel (time-slot grouping). In turn, the space table 170 maps this current channel number to the boundaries of the Host's memory partition that is associated with this channel. The lower boundary points to the base address of this (destination) memory partition. The upper boundary defines the allocated address range.

The validated Message contains an address field that is referenced to the base address of the channel's (destination) memory partition. The BIC 110 should perform a Memory Management Unit (MMU) function to verify that this address field points at an address that does not exceed the channel's upper boundary. If the address in the validated Message exceeds the channel's upper limit, then the Message shall be discarded and a "destination address out-of-range" fault shall be flagged for this channel. If the address field passes the BIC's MMU range check, then the BIC 110 shall use it as an offset from the memory partition's base address, and write the data part of the Message to the resulting address. Thus, each BIC 108 and 110 will write validated Messages to its associated Host 150 or 152.

It should be noted that the destination memory partition may be shared by multiple applications that have read-only access. This can be done by relocating the received Data Block, e.g., by copying the receive buffer to a "holding" buffer, or by swapping the "receive" and the "holding" buffers during the inter-message gap time. It should also be noted that the BIC 110 can perform the above reception sequence in parallel with actually outputting serialized data, and setting up a transmission for the next time-slot.

Redundancy Management of Received Data

Figure 15:
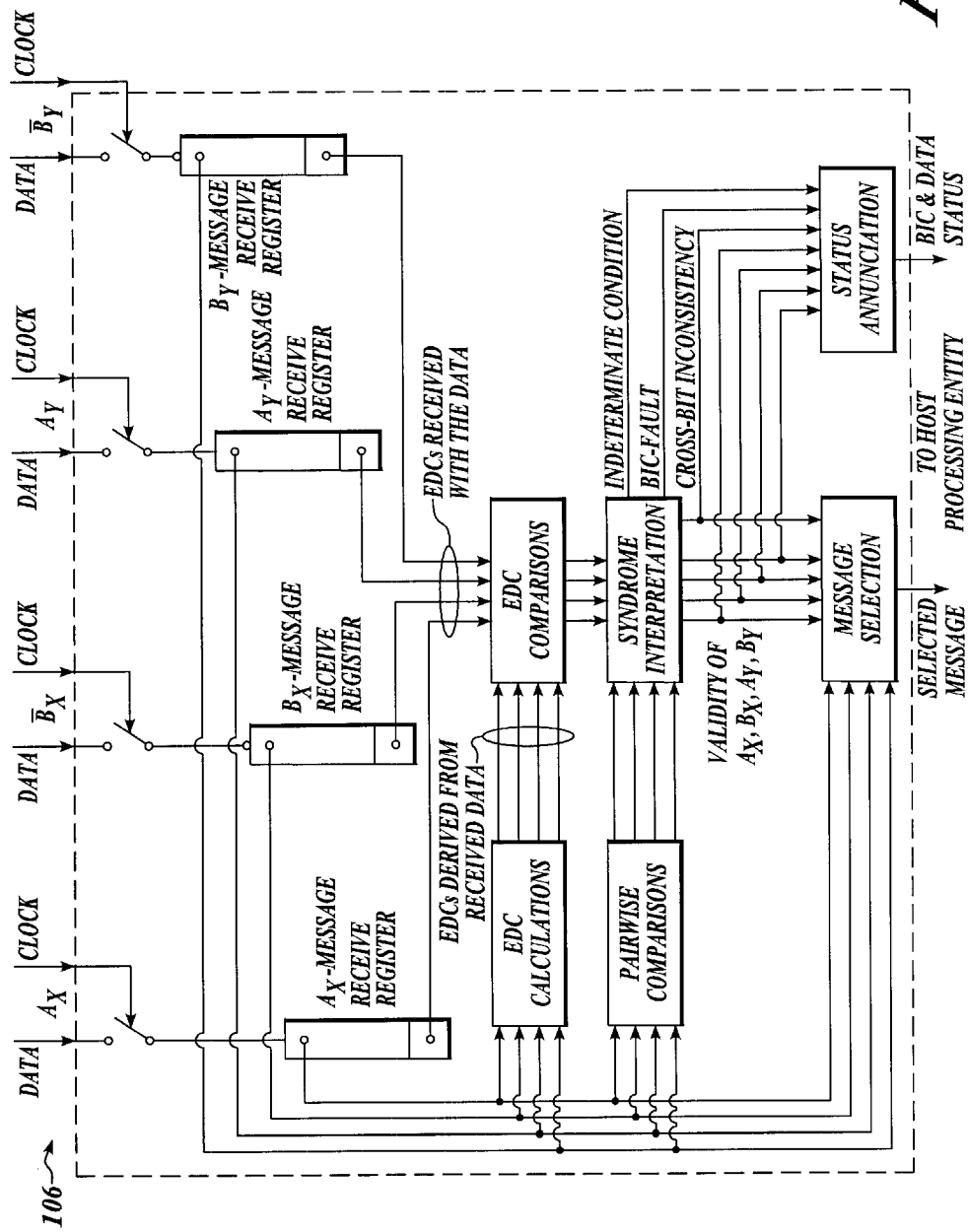
FIG. 15 is a process diagram of a redundancy management process in the bus interface controller according to the invention.

FIG. 15 illustrates another important feature of the invention which is the redundancy management of received data. The bus 106 includes the four data lines, Ax, Bx, Ay, By. Under no-fault conditions, both BICs 108 and 110 in a node receive complete and bit-identical messages on all lines simultaneously.

As shown in FIG. 15, each BIC 108 and 110 checks and compares these redundant data streams, to detect and mask various error patterns. The result of this redundancy management process is either the selection of correct data, or indication that the data is corrupted in an incorrigible manner. For example, data corruption can be caused anywhere along the data paths: BIC transmitter circuitry, bus line drivers, driver-to-line couplers, the actual lines (open, short, bridge, bad termination or power), EMI, line-to-receiver couplers, line receivers, BIC receiver circuitry, BIC redundancy management circuitry, etc.

Preferably, the redundancy management process comprises:
1. fault detection,
2. fault isolation,
3. message selection, and
4. fault annunciation.

The data bits on the Ay and By data lines are the inverse of those on the Ax and Bx lines, respectively. According to one embodiment of the present invention, this encoding is reversed prior to submitting messages from these data lines to the redundancy management process.

Fault Detection

In the preferred embodiment, fault detection includes the following activities:
1. four EDC-based completeness checks,
2. four pair-wise comparisons,
3. comparison-results consistency check (to detect certain BIC voter hardware faults), and
4. cross-BIC consistency check (to ensure that both BICs 108 and 110 have arrived at the same conclusion regarding the validity of the received messages).

Each Data Block includes a 4-bit Error Detection Code. The BIC 108 or 110 applies the same algorithm to the Message part of each of the four received Data Blocks (Ax, Ay, Bx, By). Each time, the resulting calculated EDC is compared against the EDC that was received as part of the same Data Block. A Message shall be declared "complete", if these two EDCs are identical.

The following Message comparisons are performed: Ax vs. Ay, Ax vs. By, Bx vs. Ay and Bx vs. By.

With four items (Ax, Ay, Bx, By) it is possible to form six distinct pairs. However, pair AxBx is generated by the single BIC 110, as is pair AyBy. These pairs could contain correlated errors, and are excluded from participating in the voting process.

A BIC Fault is declared, if the results from the pair-wise comparisons are inconsistent. The four pair-wise comparisons involve only four items; if three of the pairs match, then the fourth pair must also match. If not (for example, 1 of 4 pairs mismatches), then an error has occurred in the BIC logic. This inconsistency cannot be isolated, since it cannot be determined if it is caused by the mismatch being incorrect, or one or more of the matches being incorrect. Hence, all copies of a received message are declared invalid if their comparison causes a BIC-fault. For example, Bx=By and By=Ax and Ax=Ay→Bx should be equal to Ay. Thus, detection of a BIC Fault is independent of the results from the EDC-based completeness checks.

An Indeterminate Condition is declared if both of the following conditions are detected:
1. all four copies of a received Message are complete (passed the EDC check),
2. two non-overlapping pairs mismatch.

The latter condition means that each of the four pair-wise compared messages only matches one of the two messages it is compared against. An Indeterminate Condition cannot be resolved. Hence, all copies of messages should be declared invalid if they cause detection of an Indeterminate Condition.

For example: $A_x$, $A_y$, $B_x$, By are complete, but $A_x^1 A_y$ and $B_x^1 B_Y$ (or: $A_x^1 B_y$ and $B_x^1 A_y$)

The results from the above Fault Detection processes are interpreted by the Fault Isolation process. The latter process determines the validity of each of the four redundant messages, and derives a single flag that indicates whether valid messages were received. This flag is exchanged between the paired BICs. A Cross-BIC-Inconsistency is declared if the local BIC's flag is not equal to the flag received from the opposite BIC.

The above described fault detection mechanisms are also used for transmission wrap-around monitoring. For this purpose, each transmitting BIC 108 or 110 listens to the outputs of its own line drivers 124 or 126 and those of the other BIC in the same node. Received wrap-around data streams are subject to the same reception, fault detection and fault isolation processes as messages that are received from any of the other nodes. A Wrap-Around Fault is declared if the following three conditions are met:
1. the BIC has transmitted a message during the current time-slot,
2. the Fault Isolation process has declared the resulting received message invalid, and
3. no BIC-Fault was declared during the current time-slot.

Fault Isolation

Fault isolation is the identification of invalid messages, based on interpreting the results from the fault detection process. Conversely, it is the identification of valid messages.

A message shall be declared valid, if and only if the following four conditions are met:
1. the message matches at least one other complete message,
2. the message is complete (e.g., passed the EDC check),
3. no BIC-fault has been detected,
4. no Indeterminate Condition has been detected.

Appendix B provides a representation of the Fault Isolation process in truth-table format.

A Message is considered Error-Free if it was received complete and without miscompares on all four data lines, e.g., all four Messages are Valid. A Correctable Error occurs if only two or three Valid Messages are received; the data line redundancy makes it possible to mask such errors. An Incorrigible Error occurs if none of the received Messages are Valid.

The fault isolation process consolidates the validity of the four individual messages into a single flag that indicates whether Valid Messages were received. This is the same as determining the presence of an Incorrigible Error.

Message Selection

Message selection is the process that reduces the set of redundant Valid Messages to a single message. The Fault Detection process guarantees that all Valid Messages are identical. If there are no Valid Messages (for example, an Incorrigible Error has been detected), then no message shall be selected, since neither the Address Field nor the Data Field of the resulting message would be trustworthy.

Hence, the message selection process is as follows:
1. if there are no Valid Messages, then there should be no selection, or
2. if there are Valid Messages, then any (arbitrary) one of these Valid Messages should be selected.

If there is a Selected Message, then it should be transferred to the memory of the BIC's host processing entity 102 unless the Validity Status Bit contained in this message is not set to "Normal Operation".

Reception Status Annunciation

The BIC also includes a Reception Status Register for each of the 256 Channels. The following status flags are posted on a "per-Channel" basis:
1. occurrence of a correctable error (separate flag for Ax, Ay, Bx, and By sub-bus),
2. BIC fault,
3. Indeterminate condition,
4. message destination-address out of range (boundary violation attempt).

The host 102 has read-only access to these registers. The BIC 108 or 110 clears each Channel-register that is accessed by the host 102. Clearing a register upon read-access by the host 102 means that the register contents reflects the Reception Status since the last time the host "looked".

Control of the BICs by Host

Each BIC 108 and 110 will maintain a Command Register to its host processing entity 102 with "write" access. The BIC shall recognize two host-commands:
1. Normal Transmission, and
2. DPRAM Access Enabled.

In this case, the Command Registers can be implemented as a discrete input, or as an actual register/memory location.

If the Normal Transmission command is set to "false" (e.g., zero), the BIC shall only perform synchronization and transmission of data in time-slots that are time table version-independent. The BIC 108 or 110 shall initialize the Normal Transmission command flag to "false" upon power-up/reset.

The Normal Transmission command flag shall remain set to "false" until changed by the BICs host 102.

It should be noted that the Normal Transmission command allows the host to stop all Channel transmissions of its node. It can be used if it is determined that the BIC(s) 108 and 110 have a time table version that is incompatible with that of the other nodes in the system. Otherwise, a single-node could violate the time-partitioning of the entire bus.

The BIC 108 or 110 should not access the Dual Port RAM unless the DPRAM Access Enabled is set to "true" (e.g., non-zero). The BIC should initialize DPRAM Access Enabled command flag to "false" (e.g., zero) upon power-up/reset. The DPRAM Access Enabled command flag shall remain set to "false" until changed by the BICs host 102. While DPRAM Access Enabled is set to "false", the BIC is allowed to perform synchronization and transmit Idle Messages and transmit the Time table Version in the version-independent time-slots.

Here, the BIC 108 or 110 should not access the Dual Port RAM until it has been cleared/initialized by the host 102. Otherwise, after power-up/reset, the BIC might respond to residual/random data in DPRAM areas that are dedicated to Transmit Ledger and Space Table information. Also, in single-host nodes 100, that host 102 must be able to access the Command Register of both BICs 108 and 110.

In addition, the BIC 108 or 110 should report its Control Status to the Host 102 via the Operational Status register. However, this may be a problem if the Operational Status Register is located in the "controlled access" DPRAM, instead of in a separately host-accessible register.

Summary

The data bus system as described above can provide for data transmission in a system having a number of nodes or processors with a very high degree of data integrity and fault tolerance. Moreover, this system can provide a very high degree of flexibility with respect to modification of the system including programming and reprogramming the processors in the nodes of the system.

For example, the dual processor node shown of FIG. 4 can easily be programmed for use as a single processor node of the type shown in FIG. 2. Either the X or Y processor may serve as the single host processor. The single processor vs. dual processor is selectable on a channel basis (table driven) and thereby permits the degree of fault tolerance to be application or data specific. For example, the data occupying one channel may be less safety critical and processing of data for that channel may optionally be selected to use the single processor option. This architecture also permits processors 150 and 152 of FIG. 4 to independently and concurrently run different applications during those microprocessor time slots that are not selected for dual sourced operations. Microprocessor resources can then be utilized efficiently for applications that do not require fault containment at the node level. System processing and operating times are thereby also improved.

ALTERNATIVE EMBODIMENTS

In an alternative embodiment of the invention, processing nodes are grouped into multiple physically isolated resource enclosures, one or more processing nodes per enclosure. The processing node is connected to a set of four bus signal lines, Ax, Bx, Ay and By, as indicated by reference numeral 106 in FIG. 2. According to one preferred embodiment, the bus 106 has four transmission lines in a dual-dual configuration. Each node includes a microprocessor having transmission privileges on one or more of the data lines of the bus 106 during uniquely designated time-slots. In preferred embodiments of the invention, there is no centralized control of the bus. Rather, each node contains the two arbitration circuits, described in detail below. The purpose of the two arbitration circuits is to manage all data transfers between the bus 106 and a memory associated with the host processor. The two arbitration circuits independently determine if such a timeslot is coming up, and cross-enable each other's bus line drivers accordingly. In other words, transmission only ocurs if both arbitration circuits of a arbitrator-pair agree. Each arbitration circuit-pair also synchronizes to two arbitration circuit-pairs in other nodes. The above arbitration circuit functions are described in detail below.

An alternative backplane bus architecture disclosed in above incorporated application Ser. No. 09/454,057, includes multiple independent data communication networks or local area networks (LANs), each having two or more data communication lines or sub-busses. Each processing node transmits on a subset of the sub-busses of each communication network, simultaneously broadcasting identical data on each sub-bus. Each data communication network is extended in its entirety from the processing node or nodes in each resource enclosure to the processing node or nodes in each other resource enclosure. Broadcasting privileges for different ones data lines or sub-busses of the data communication networks are dedicated to the processing nodes in one enclosure. The data lines used for broadcasting by the processing nodes in one enclosure are monitored in a receive-only mode by the processing nodes in each other enclosure. Data transmissions are thereby received by all processing nodes in all enclosures. Furthermore, the individual data communication networks are isolated from one another so that transmission synchronization between the processing nodes of different enclosures is not needed.

According to preferred embodiments of the invention disclosed in above incorporated application Ser. No. 09/454,057, each individual network, or sub-bus, of each data communication network includes a single data bus on which data is transferred in serial fashion, using standard protocol for serial communication. Alternatively, data is transferred in parallel fashion. Thus, the preferred minimization of the number of physical connections associated with the networks is satisfied. Data communication networks are preferably formed as high speed data communication networks capable of supporting any local area network (LAN) protocol, including Ethernet®, 10Base-T, and fast Ethernet or 100Base-T. Alternatively, data communication networks support fiber optic Ethernet variations that allow the network's capabilities to be expanded to greater physical distances.

The alternative network topology backplane bus architecture disclosed in above incorporated application Ser. No. 09/454,057 includes multiple processing nodes sharing multiple independent data communication networks, each independent data communication network or bus including multiple independent data lines or sub-busses. Each processing node has both transmit and receive privileges on a subset of the data lines or sub-busses of multiple independent data communication network but is restricted to receive only privileges on the remainder of the data lines or sub-busses. Each processing node receives data transmissions broadcast on the remainder of the data lines or sub-busses. The processing nodes use their transmit and receive privileges on the first data lines or sub-busses for all of: local communication within the processing node, broadcasting transmissions to other processing nodes, and receiving data transmissions from other processing nodes. Use of the first data lines or sub-busses is time-shared by the processing nodes having transmission privileges in synchronization with the other processing nodes also having transmission privileges on the first data lines or sub-busses. The processing nodes enjoying transmit and receive privileges on the first data lines or sub-busses are preferably co-located in a first resource enclosure or cabinet. Preferably, one or more processing functions, for example, flight critical functions, are duplicated in additional processing nodes located in a second physically isolated resource enclosure or cabinet. Each of the data communication networks is extended to the additional processing nodes in the second enclosure. The processing nodes in the second enclosure are connected to each of the first and second data communication networks but are restricted to receiving transmissions from the first data lines or sub-busses while they each enjoy both receive and transmit privileges on the second remaining data lines or sub-busses.

The processing nodes in the first enclosure continue to function and communicate with one another using the first data lines if an "active/on" failure in the other enclosure prevents data transfer on the second data lines. Similarly, the processing nodes in the second enclosure continue to function and communicate with one another using the second data lines if an "active/on" failure in the first enclosure prevents data transfer on the first data lines. Thus, the processing nodes in either enclosure can continue to function and communicate with one another on one subset of the data lines if an "active/on" failure in the other enclosure prevents data transfer on the other subset of the data lines. Data transfer on any data line is unaffected if any processing nodes fail in a "passive/off" mode, thus still active processing nodes continue to communicate on each of the data communication networks.

Figure 16A:
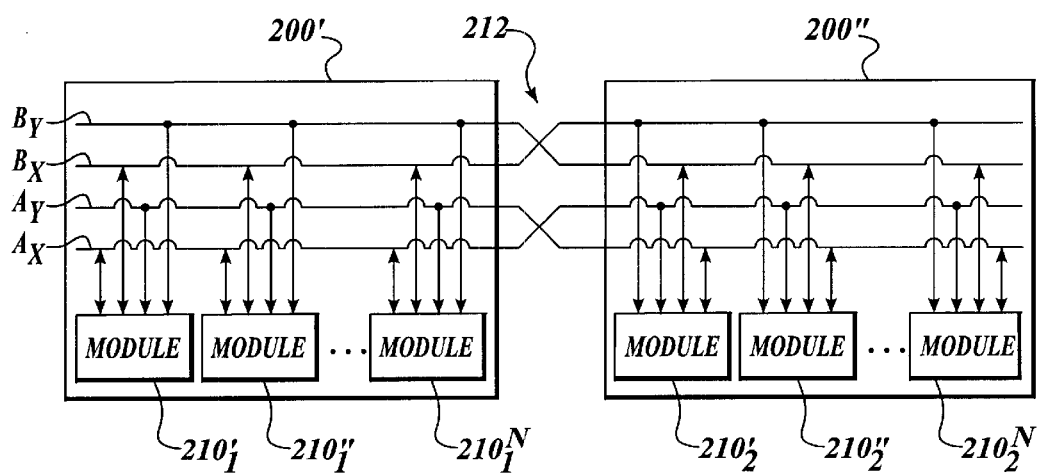
FIG. 16A illustrates an example of an alternative backplane bus architecture according to the invention, including two resource enclosures, wherein processing nodes in contained in each resource enclosure have full reception privileges on all sub-busses of each data communication network but are restricted to transmitting on less than all of the sub-busses.

FIG. 16A illustrates an example of a network topology backplane bus architecture disclosed in above incorporated application Ser. No. 09/454,057, including two or more resource enclosures or cabinets $200_1$, $200_2$ through $200_N$ (not shown). Resource enclosures 200 each include one, two, or more modules, 210', 210" through $210^N$, each module hosting one or multiple application functions and sharing the backplane bus 212. In FIG. 16A, multiple modules 210' through $210^N$ are preferably divided into two groups physically isolated in resource enclosures $200_1$ and $200_2$. For example, three or more modules $210_1'$, $210_1''$ through $210_1^N$ are installed in one resource enclosures $200_1$ and another three or more modules $210_2'$, $210_2''$ through $210_2^N$ are installed in another physically isolated resource enclosure $200_2$. Within each resource enclosure 200 modules 210' through $210^n$ intercommunicate via fault tolerant data bus 212 of the invention. The two groups of modules $210_1'$ through $210_1^N$ and modules $210_2'$ through $210_2^N$ also intercommunicate via fault tolerant data bus 212 of the invention.

The network topology backplane bus 212 of the invention includes multiple sets of independent data communication networks. Each module 210 broadcasts to all other modules 210 in each enclosure 200 and receives input from all other modules 210 in its own and other enclosures 200, but modules 210 within each enclosure 200 transmit or broadcast on a different independent data communication network. In the preferred embodiment shown in FIG. 16A, the network topology backplane bus 212 preferably includes two sets "A" and "B" of two multi-transmitter/multi-receiver data sub-busses "x" and "y" forming four transmitter/receiver sub-busses Ax, Ay, Bx, By. Each group of modules 210 are permitted to transmit on only two of the four sub-busses. For example, modules $210_1'$ through $210_1^N$ of resource enclosure $200_1$ are permitted to transmit on the two "X" sub-busses Ax, Bx, while modules $210_2'$ through $210_2^N$ of resource enclosure $200_2$ are permitted to transmit on the two "Y" sub-busses Ay, By. Each of modules $210_1'$ through $210_1^N$ and modules $210_2'$ through $210_2^N$ are permitted to receive on all four transmitter/receiver sub-busses Ax, Bx, Ay, By. Modules 210 that are connected to a data communication network in a passive "receive only," or monitoring, mode cannot interfere with data traffic on the network. Thus, modules $210_1$ communicate with other modules $210_1$ locally within first enclosure $200_1$ via "x" sub-buses Ax, Bx of first and second data communication networks A, B, respectively, and transmit data to remote modules $210_2$ within second enclosure $200_2$ via "y" sub-buses Ay, By of first and second data communication networks A, B, respectively. Similarly, modules $210_2$ communicate with other modules $210_2$ locally within second enclosure $200_2$ via "y" sub-buses Ay, By of first and second data communication networks A, B, respectively, and transmit data to remote modules $210_1$ within first enclosure $200_1$ via "x" sub-buses Ax, Bx of first and second data communication networks A, B, respectively.

Figure 16B:
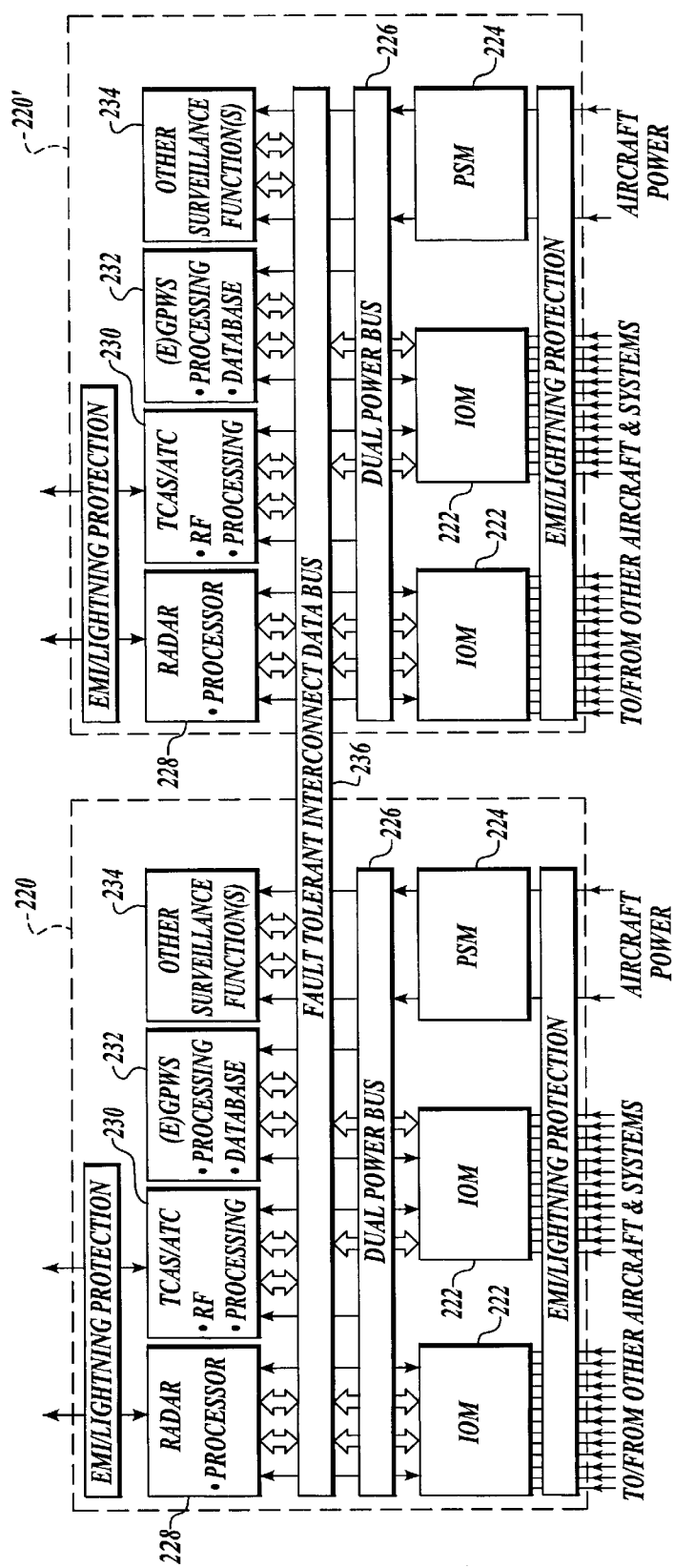
FIG. 16B illustrates an example of the backplane bus architecture illustrated in FIG. 16A applied to an integrated hazard avoidance system.

FIG. 16B illustrates one embodiment of the invention incorporating the microprocessor based systems of the aircraft IHAS 10 system, shown in FIG. 1. In FIG. 16B, IHAS 220 system module may host applications of any criticality level from non-essential to flight critical. As described above, the central computer 18 (shown in FIG. 1) of the IHAS 220 system uses conventional programs for generating the basic ground proximity warnings (GPWS) including enhanced ground proximity warnings (EGPWS), windshear warnings including predictive and reactive windshear alerts, and TCAS alerts, other surveillance functions may also be included. In FIG. 16B, IHAS 220 module is configured as a line replaceable unit, or LRU, having access through one or more I/O modules 222 to and from other aircraft systems, including, for example, central computer 18. Aircraft power is supplied via a power supply module 224 to a power bus 226 accessible by all the processing functions. The processing functions include, for example, radar processing 228, TCAS/ATC processing 230, GPWS or EGPWS processing 232 as well as other surveillance functions 234. Radar processing 228 preferably has direct access to radar antenna inputs while TCAS/ATC processing 230 has direct access to transponder signals. IHAS LRU 220 module includes a fault tolerant network topology backplane bus 212 of the invention that includes multiple sets of independent data communication networks. Each processing unit 228, 230, 232, 234 has both transmit and receive privileges on each of two sub-busses included in a first data communication network and monitors transmissions on a second pair of sub-busses forming a second data communication network.

One preferred embodiment of the present invention provides additional processing redundancy by providing that the two pairs of individual data communication networks are used for data communication within and between two redundant sets of processing nodes in different physically isolated enclosures. In FIG. 16B, network topology backplane bus 212 extends from the single IHAS LRU 220 module shown to a second redundant IHAS LRU 220' module having the same functional processing capabilities. Thus, radar processing 228, TCAS/ATC processing 230, GPWS or EGPWS processing 232 and other surveillance functions 234 are repeated in second IHAS LRU 220' module. Similar processing nodes included in second IHAS LRU 220' module have both transmit and receive privileges on each of two sub-busses included in the second data communication network and monitors transmissions on the pair of sub-busses forming the first data communication network.

Bus Architecture Fault Protection

As described above, multiple system resources, or processing nodes, have data transmission privileges on one or more data lines of each local area network (LAN), or data communication network, A and B. Hence, the available data transmission bandwidth on each data line, or sub-bus, is allocated between the various processing nodes. Preferably, time allocation on the individual networks, commonly referred to as time partitioning, is provided by time-multiplexing on each network, wherein bus time is divided into consecutive fixed-length time-slots, that are grouped into fixed-length cyclic frames, using a table-driven protocol that uniquely defines the time-slot configuration and allocation. Preferably, the time-multiplexing is driven in a fully deterministic manner by a time table incorporated into each system processing node and is replicated for each individual data line, or sub-bus, of each data communication network. However, as discussed above, other known carrier sense multiple access/collision avoidance (CSMA/CA) schemes are equally applicable. Data integrity is guaranteed using error detection code incorporated into each message transmitted. For example, 32-bit cyclic redundancy code (CRC) is incorporated into each message transmitted. The CRC is automatically detected by all processing nodes receiving the message and the validity of the transmitted message is verified upon the quality of the received CRC, as described in detail below.

Bus Determinism

Ethernet® is the transmitting protocol common to most networks using bus topology for avoiding conflict between messages sent on the same network by different processing nodes. Typical Ethernet® LAN protocol uses carrier sense multiple access and collision avoidance or CSMA/CA, wherein the transmitting node monitors or "listens" to the traffic on the network and waits for a pause before transmitting or "speaking." When multiple nodes try to transmit on the network at the same time, all the nodes first stop trying, wait a random time period, then attempt to access the network again. Accordingly, networks using the CSMA/CA protocol cannot guarantee when, or if, data transmissions from a particular processing node will be transmitted. Under heavy load conditions, the usable bandwidth of a typical 10 Mbps network using Ethernet® protocol may be as low as 1.5 Mbps. Furthermore, the interface circuit responsible for administering the CSMA/CA protocol typically includes a transmission retry threshold. Repeated collisions with transmissions by other nodes may eventually exceed the retry threshold at which point the interface circuit disables itself and generates a an error message. Thus, future data transmissions from the disabled node are lost to the rest of the system. In contrast, according to the present invention, message transmission on the network is fully deterministic, which provides full system synchronization and overcomes the limitations of previously known collision avoidance protocols. Time allocation, or time partitioning, on the individual networks is provided by time-multiplexing on each network. Time-multiplexing provides each processing node having transmission privileges on the network a transmission time slot period having a specified frame length, thus guaranteeing maximum bandwidth and network efficiency impossible with previously known network protocols, such as Ethernet®.

Network determinism provided by scheduling transmissions using a time table, which determines which of several processing nodes has permission to transmit on the network during a specified time period. A time table for driving the deterministic time-multiplexing of the transmissions is incorporated into each system processing node for each individual data line, or sub-bus, of each of data communication network A and B. The time table provides the time-slot transmission schedule for the entire frame period and is stored in non-volatile memory. Each data byte of memory contains a node identification (node ID) that identifies the node the that is scheduled to transmit during that time slot. Furthermore, a time table version number is stored in the time table and is accessed by the node processor to determine version compatibility. The version number is preferably stored as a 6-byte word. 16-bit CRC for each of the time table data and the time table version are stored at predetermined locations in the time table for use in verifying time table integrity. The time table in each node is either identical or at least compatible with the time table incorporated into each of the other nodes and is preferably synchronized with each of the other time tables to ensure that collisions do not occur on the network. The time table is preferably replicated for at least each individual sub-bus Ax, Ay, Bx, By for which the processing node has transmission privileges.

In a preferred embodiment, time table synchronization occurs on two levels: intra-node synchronization and inter-node synchronization. Intra-node synchronization is provided by multiple network arbitration circuit that are synchronized with one another to provide a time table data cross-checking function. Failure of the cross-check results in an abort of the message transmission. Intra-node synchronization is present in a preferred embodiment of the invention to provide maximum protection. Intra-node synchronization is not present in applications where such a high level of protection is not desirable. Inter-node synchronization is provided by synchronizing the time table transmission sequence contained in each node with that of the time tables incorporated into other nodes having transmission privileges on the same network sub-bus. An inter-node synchronization failure in one node does not interrupt continued message transmission among the remaining nodes because the clocks in the other nodes maintain inter-nodal synchronization. Thus, the synchronization scheme outlined ensures bus time partitioning in the presence of individual node failures.

The time slot period and frame length are system parameters which are determined according to a number of considerations. The time slot period is preferably based on typical Ethernet® message sizing and provides for inter-gap message time requirements and system clock drift. According to one preferred embodiment of the invention, the time slot period is compatible with Ethernet® 10Base-T protocol specifications, wherein the minimum message size is 72 bytes, including 46 data bytes and 26 overhead bytes, and the time to transmit a message of the minimum size is 57.6 microseconds. Preferably, the time slot period also accounts for a specified inter-gap delay of 12 bytes, or 9.6 microseconds, between message frames. The minimum time slot period calculated thusly is 57.6+9.6=67.2 microseconds. In the interest of simplicity and to provide for some margin, one preferred embodiment of the invention uses a time slot period of 100 microseconds. However, those of ordinary skill in the art will recognize that a 100 microsecond time slot period is chosen arbitrarily and that the invention is not intended to be limited to the disclosed embodiment.

The frame length determines the number of time slot periods that can occur before system resynchronization. Therefore, frame length depends upon the number of time slots desired and the maximum worst-case clock drift allowed prior to resynchronization. Regardless of the precision of the clocks used in synchronizing the time slot periods allocated to each processing node for message transmission, timing differences due to drift still occur. Preferably, a "dead time" is inserted at the end of each time slot periods during which no data is transmitted. This dead time prevents possible collisions during time slot transitions. The time table resynchronization schedule, the clock drift, and the magnitude of the dead time determine the overall frame length.

The time reference drift, or "clock drift," depends upon the worst-case frequency difference between two clock oscillators. The preferred field programmable gate array (FPGA) base oscillator frequency is 40 MHz+/−0.01% which provides results in a worst-case frequency difference between two clock oscillators of 0.02%. In a preferred embodiment, a period of 5%, or 5 microseconds, is consumed by worst-case drift. This choice of the maximum period to be consumed by worst-case drift is chosen to provide a desired system efficiency and is not intended to limit the invention in any way. Another period can be chosen without altering the practice of the invention. Therefore, two oscillators operating at the tolerance extremes undergo drift resulting in a 5 microsecond clock difference within 25 microseconds or 250 time slot periods. The clock drift is additive to the inter-gap delay to determine minimum dead time. In the preferred embodiment, therefore, the minimum dead time is 5 microseconds clock drift plus 9.6 microseconds inter-gap delay, or 14.6 microseconds.

The invention provides improved bandwidth over Ethernet® protocol. The usable bandwidth of a typical Ethernet® system is reduced by the message overhead, including preamble, source and destination addressing, CRC, and inter-gap delay, to less than the stated data rate of 10 Mbps. The implication, therefore, is that the true or effective data rate is less than 10 Mbps. Assuming an ideal Ethernet® in which no collisions occur, the maximum effective data using all minimum message lengths is determined to be 5.48 Mbps. Assuming that all messages are of maximum length, the effective data rate is 9.75 Mbps. Therefore, larger message sizes are more efficient for transferring data.

The ideal Ethernet® assumptions as to overhead are applicable to the present invention. However, the rounded-up 100 microsecond fixed time slot periods add additional message overhead that affect the effective data through-put rates using 10Base-T. As in Ethernet® protocol, larger message sizes are more efficient for transferring data. Assuming that all messages are of maximum length, the effective through-put rate is 9.23 Mbps resulting in a 95% efficiency. Using a fixed time slot period and fully deterministic time-multiplexing message transmission, the data rate on the network is a constant that is not affected by heavy loads. 100Base-T provides similar efficiencies depending upon the time slot period used. Although the invention is described using the currently preferred Ethernet® bus communications protocol, those of ordinary skill in the art will recognize that the invention is completely independent of the type of bus communication protocol used.

The number of processing nodes the invention is capable of supporting depends upon the width of the time table memories. In the preferred embodiment, the time table memories are 8 bits wide so that each memory can specify 1of 256 unique nodes. In one preferred embodiment, 5 node identification bits are chosen such that 32 unique node addresses are possible. Therefore, the base-line system parameters according to one preferred embodiment are a frame length of 25 milliseconds which, when divided over 250 time slots, results in a time slot period of 100 microseconds.

Alternatively, in a simplified embodiment, time slot allocation replaces the time table. In such an embodiment, each node enjoys equal time access on the data communication network, and time slots are determined using only node identification (node ID), as describe in detail above. The time slot period is preferably determined as described above. Furthermore, the illustrative embodiments of the invention described above using either a time table or a node ID to determine the unique time slot during which a particular processing node is intended to transmit on the data line is not intended to limit the scope of the invention in any way. Rather, other means for determining the unique time slot are within the ability of those of ordinary skill in the art; such other means are intended to be encompassed within the scope of the present invention.

Node Architecture

Figure 17A:
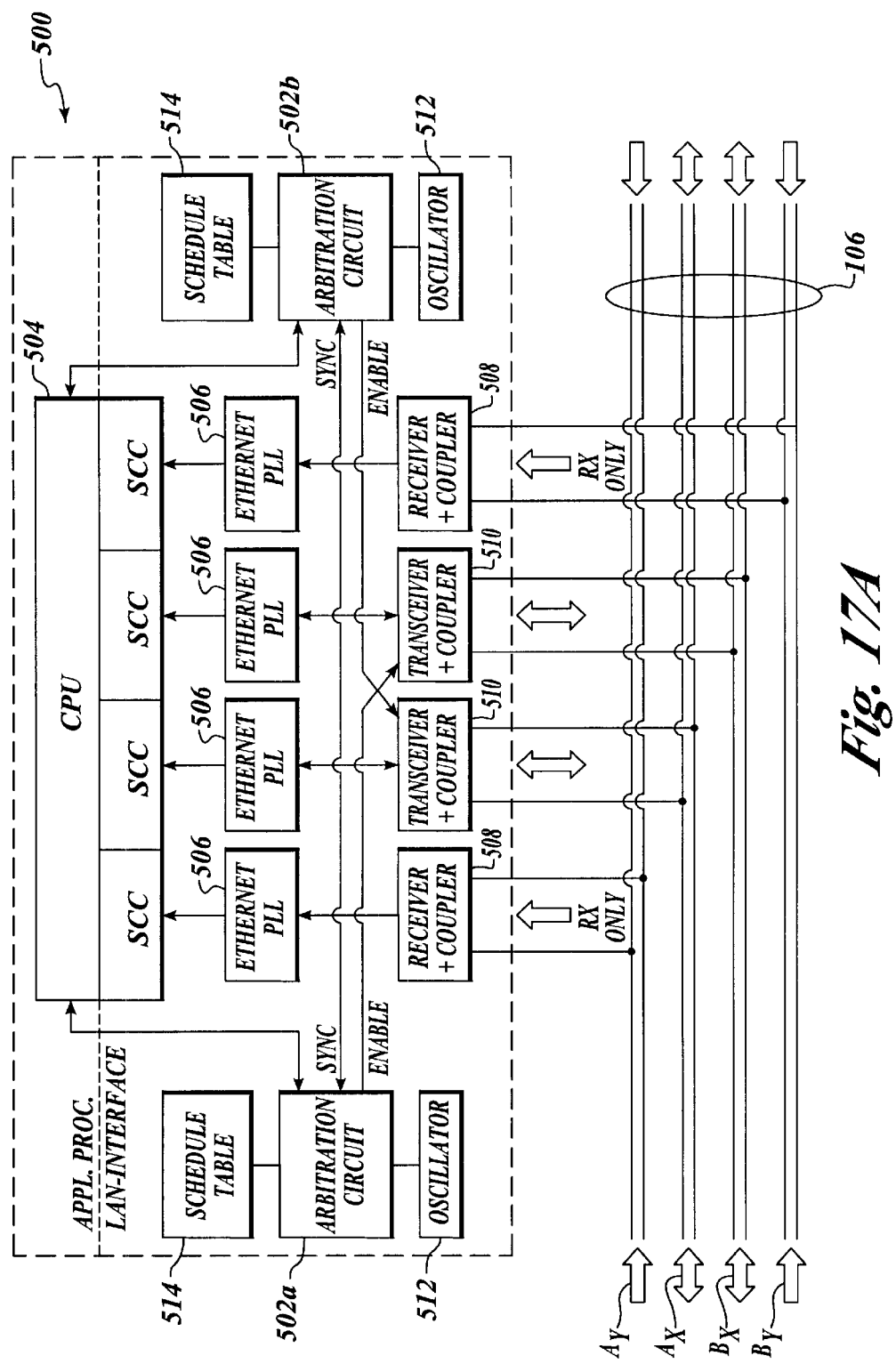
FIG. 17A illustrates an example of an alternative backplane bus architecture including a processing node of the data bus system according to the invention, wherein the processing node includes a processor capable of hosting multiple application functions and a backplane bus interface.
Figure 17B:
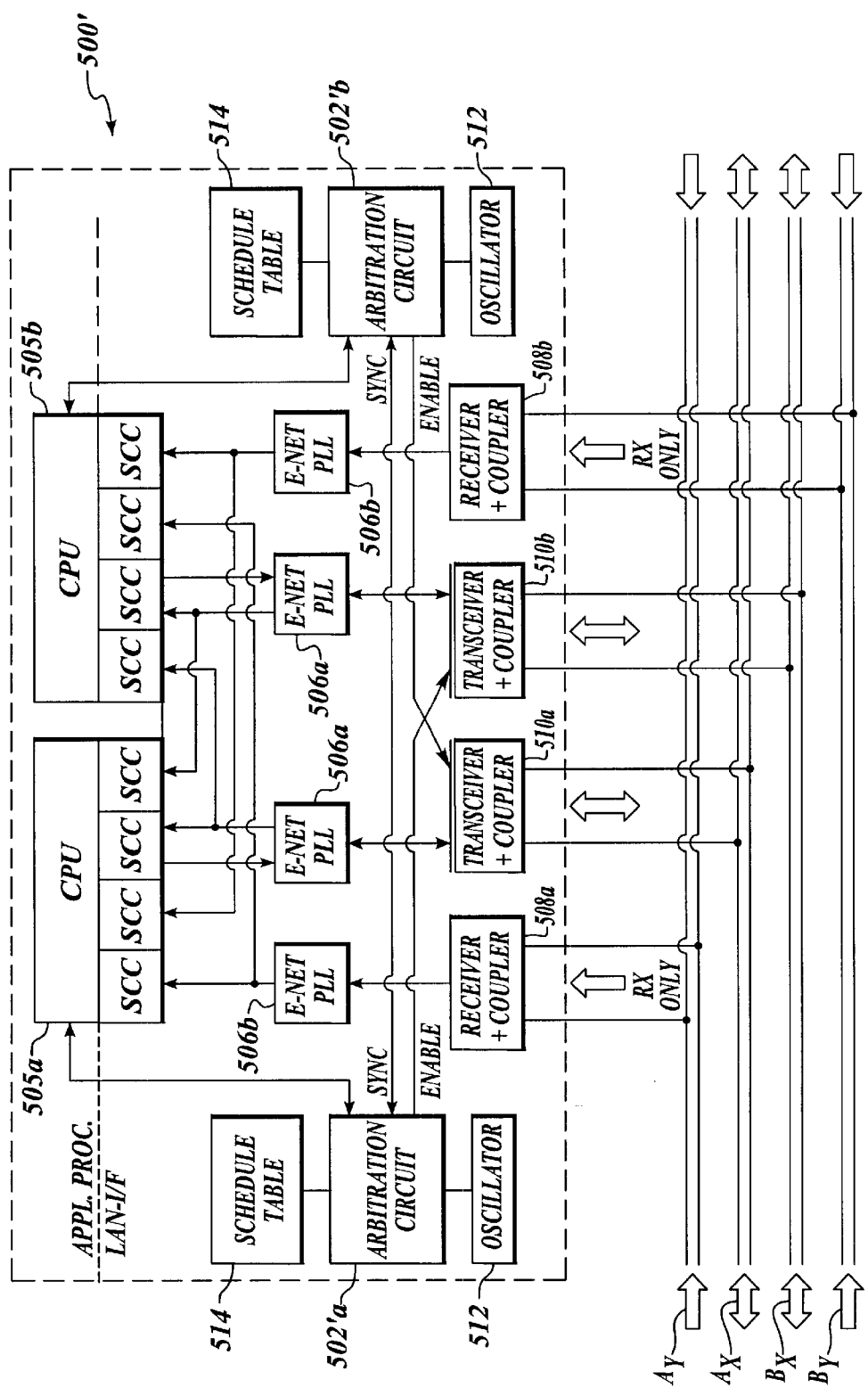
FIG. 17B is a block diagram of a node of the data bus system utilizing two processors and two arbitration circuits according to the invention.

Time partitioning on the network is administered by network arbitration circuits, or arbitrators, within each processing node. The network arbitrator functions in both single and dual processing lane architectures. FIG. 17A illustrates the network arbitrator in a node having a single processor interface, while FIG. 17B illustrates the network arbitrator in a node having a dual processor interface. In FIG. 17A, a node 500 having a single processor interface includes two network arbitrators 502 interfaced to a single processor 504 capable of hosting multiple application functions. Processor 504 is preferably any commonly available processor having a number of high-speed, full-duplex serial ports and communications processor. For illustration purposes, processor 504 is shown herein as an embedded microprocessor having the internal architecture shown in FIGS. 17A and 17B. An Ethernet® phase lock loop (PLL) circuit 506, preferably in the form of an integrated circuit, interfaces one serial communication controller (SCC) port of processor 504 to one of two backplane receivers 508a and 508b and one of two backplane transceivers 510a and 510b. The backplane bus has four transmission lines in a dual-dual configuration. Receivers 508 couple processor 504 to different ones of the transmission lines of one network in a receive only mode. For example, receivers 508 couple processor 504 to receive data transmissions on one or more bus signal lines, i.e. data and clock lines, of data communication network B as indicated by references Bx and By. Transceivers 510 couple processor 504 to both transmit and receive communications on different ones of the transmission lines of the second network. For example, in FIG. 17A transceivers 510 couple processor 504 to transmit data and receive data transmissions on one or more bus signal lines, i.e., data and clock lines, of data communication networks "A" and "B" as indicated by references Ax and Bx. Alternatively, as described in detail above, transceivers 510 couple processor 504 to transmit data and receive data transmissions on any or all of bus signal lines, i.e., data and clock lines, of data communication networks "A" and "B".

Arbitrators 502 act analogously to a switch for opening access between processor 504 and the data lines during the time period when node 500 is permitted to transmit. Arbitrators 502 open access to the data lines by enabling transceiver 510 and informing processor 504 that the access is open. Arbitrators 502 regulate the opening and closing of the access between processor 504 and the data lines by synchronizing both with counter-part arbitrator 502a or 502b internal to node 500 and with other nodes 500, according to clock oscillator 512 and an independent table memory 514. Each of arbitrator 502a and 502b signals associated processor 504 when access is open. Thus, arbitrators 502 manage all data transfers between the bus lines and an application memory portion of host processor 504. However, in contrast to the pair of Bus Interface Controllers ("BICs") 108 and 110 used in the disclosed fault tolerant data communication network of FIG. 2, arbitrators 502 do not perform data cross-checking, data redundancy management, i.e., fault detection and data selection, or microprocessor interface functions. Rather, arbitrators 502 according to the present invention, provide synchronization and cross-enabling functionality.

Each arbitrator 502 is coupled to independent clock oscillator 512 and independent table memory 514. A space table, internal to processor 504, operatively associated with each arbitrator 502 indicates the address space in a processor application memory from which the data is to be transferred to the bus. Processor 504 creates two identical transmit messages, one for each transmission by each transceiver 510, because the PLL circuits do not allow a single SCC port to drive two PLL circuits during transmission due to the hand-shaking requirements between a PLL circuit and a SCC port. In the single processor configuration, processor 504 must either check its own outputs during transmission via a wrap-around check or rely upon an external receiver to correctly acknowledge receipt of the transmission. Each arbitrator 502 independently determines if a time-slot uniquely designated for transmission is coming up and coordinates activities with the other arbitrator 502 via handshake signals and cross-enabling of the other's drivers, thereby permitting transceivers 510 to transmit messages onto two data lines: sub-busses Ax and Bx of data communication networks "A" and "B," respectively, during the designated time slot period. Each arbitrator pair 502 also preferably synchronizes to arbitrator pairs in other nodes. Although the functioning of node 500 is illustrated in FIG. 17A for convenience in an embodiment wherein transmit/receive privileges are restricted to two data lines: sub-busses Ax and Bx of data communication networks "A" and "B," respectively, the invention is equally applicable to an embodiment wherein each node 500 has transmit/receive privileges on all available data lines, as described in detail above.

Each independent clock oscillator 512 coupled to one of arbitrators 502 prevents failure of a single oscillator from causing processing node 500 from transmitting during another node's time-slot, and thereby causing failure of the bus for all nodes. Each independent time table memory 514 coupled to one of arbitrators 502 contain information regarding the unique allocation of transmission time-slots to various nodes, and the boundaries of the associated areas in the application memory of processor 504 where data-to-be transmitted is read, and received and validated data is written. Time table 514 associated with each arbitrator 502 is alternatively a single time table shared within a single processing node for each of the individual sub-bus Ax, Ay, Bx, By for which the processing node has transmission privileges.

FIG. 17B illustrates the network arbitrator in a node having a dual processor interface. Each network arbitrator is connected to a respective one of two dual processors. This architecture also permits the dual processors to independently and concurrently run different applications during those microprocessor time slots that are not selected for dual sourced operations. Such dual processor nodes are used when the data occupying one channel are less safety critical and processing of data for that channel may optionally be selected to use the single processor option. Thus, microprocessor resources are utilized efficiently for applications that do not require fault containment at the node level. System processing and operating times are thereby also improved.

In FIG. 17B, a node 500' having a dual processor interface includes two network arbitrators 502'a and 502'b, each interfaced to one of processors 505a and 505b, respectively. Processors 505 are preferably again any commonly available processor having a number of high-speed, full-duplex serial ports and communications processor. For illustration purposes, processor 505 is shown herein as an embedded microprocessor having the internal architecture shown in FIG. 17B. An Ethernet® phase lock loop (PLL) circuit 506, preferably in the form of an integrated circuit, interfaces one serial communication controller (SCC) port of each processor 505 to respective ones of two backplane receivers 508a and 508b and respective ones of two backplane transceivers 510a and 510b. The backplane bus again has four transmission lines in the above described dual-dual configuration.

Ones of PLL circuits 506 interface ones of processors 505 to transmit and receive on different ones of the transmission lines of one data communication network. For example, PLL circuits 506a couple a respective one of processors 505a and 505b to both transmit and receive communications on a different one of the transmission lines of network. Transceiver 510a couples processor 505a through one PLL circuit 506a to transmit data and receive data transmissions on one or more bus signal lines, i.e., data and clock lines, of data communication network "A" as indicated by reference Ax, while transceiver 510b couples processor 505b through another PLL circuit 506a to transmit data and receive data transmissions on one or more bus signal lines, i.e. data and clock lines, of data communication network "B" as indicated by reference Bx. Ones of PLL circuits 506 interface each of processors 505 to receive transmission on each of the transmission lines of the other data communication network. For example, in FIG. 17B, ones of PLL circuits 506b couple each processor 505 through receivers 508b to receive data transmissions on one or more bus signal lines, i.e. data and clock lines, of data communication networks "A" and "B" as indicated by references Ay and By. Thus, each processor 505a and 505b transmits on one of PLL interface circuits 506a and receives from all four PLL interface circuits 506a and 506b. Alternatively, as described above in detail, transceivers 510 couple processor 505a and 505b to transmit data and receive data transmissions on any or all of bus signal lines, i.e., data and clock lines, of data communication networks "A" and "B".

Arbitrators 502' again act as a switch for opening an access window between processor 505 and the data lines during the time period when node 500' is permitted to transmit. Arbitrators 502' open the access window to the data lines by enabling transceiver 510 and informing processor 505 that the access window is open. Arbitrators 502'a and 502'b together regulate the opening and closing of the access window between each processor 505a and 505b and the data lines by synchronizing both with counter-part arbitrator 502' internal to node 500 and with other nodes 500, according to clock oscillator 512 and an independent table memory 514. Each of arbitrator 502'a and 502'b signals associated processor 505a and 505b, respectively, when an access window is open. Thus, arbitrators 502'a and 502'b manage all data transfers between the bus lines and an application memory portion of respective host processor 505a and 505b.

Each arbitrator 502' is coupled to an independent clock oscillator 512 and an independent table memory 514. Each processor 505a and 505b creates identical transmit messages for each transmission by respective transceivers 510a and 510b. Although each SCC can function in full duplex mode, processors 505 need not check their own transmit output because the other processor 505 performs this check. Each arbitrator 502' independently determines if a time-slot uniquely designated for transmission is coming up and coordinates activities with the other arbitrator 502' via hand-shake signals and cross-enabling of the other's drivers, thereby permitting transceivers 510 to transmit messages onto the data communication network during the designated time slot period. Each arbitrator pair 502' also synchronizes to arbitrator pairs in other nodes.

Each independent clock oscillator 512 coupled to one of arbitrators 502' prevents failure of a single oscillator from causing processing node 500' from transmitting during another node's time-slot, and thereby causing failure of the bus for all nodes. Each independent table memory 514 coupled to ones of arbitrators 502' contains information regarding the unique allocation of transmission time-slots to various nodes, and the boundaries of the associated areas in the application memory of a respective processor 505 where data-to-be transmitted is read, and received and validated data is written.

Although the functioning of node 500' also is illustrated for convenience in an embodiment wherein transmit/receive privileges are restricted to two data lines: sub-busses Ax and Bx of data communication networks "A" and "B," respectively, the invention is equally applicable to an embodiment wherein each node 500' has transmit/receive privileges on all available data lines, as described in detail above.

Network Arbitrator

Each processing node contains the two network arbitrators that manage flow control of all outgoing data transfers between the data communication network and an application memory portion of the host processor. The network arbitrator is responsible for intra-nodal synchronization and inter-nodal synchronization, for opening and closing access windows between the node processor and the data communication lines, and for signaling the node processor that an access window is open. The network arbitrators independently determine if a uniquely designated time-slot is coming up, cross-enable each other's bus line drivers for data transmission, and signal the host processor that the access window is open for transmission. Each arbitrator-pair also synchronizes to arbitrator-pairs in other nodes. Network transmission scheduling is described above. Intra-nodal synchronization is maintained by network arbitrator 502. At the beginning of a time slot, each arbitrator 502 sends a request-to-synchronize (R2Sync) signal to its companion network arbitrator 502 and checks for a R2Sync signal from its companion arbitrator 502. If the cross-check R2Sync is inactive, or fails, arbitrator 502 holds its internal timer and keeps monitoring the cross-check during a predetermined period, for example, 400 nanoseconds. If, at the end of the predetermined monitoring period, the cross-check R2Sync signal is still inactive, arbitrator 502 takes itself off-line. However, if the R2Sync signal is or becomes active, arbitrator 502 continues its normal operation.

Figure 18:
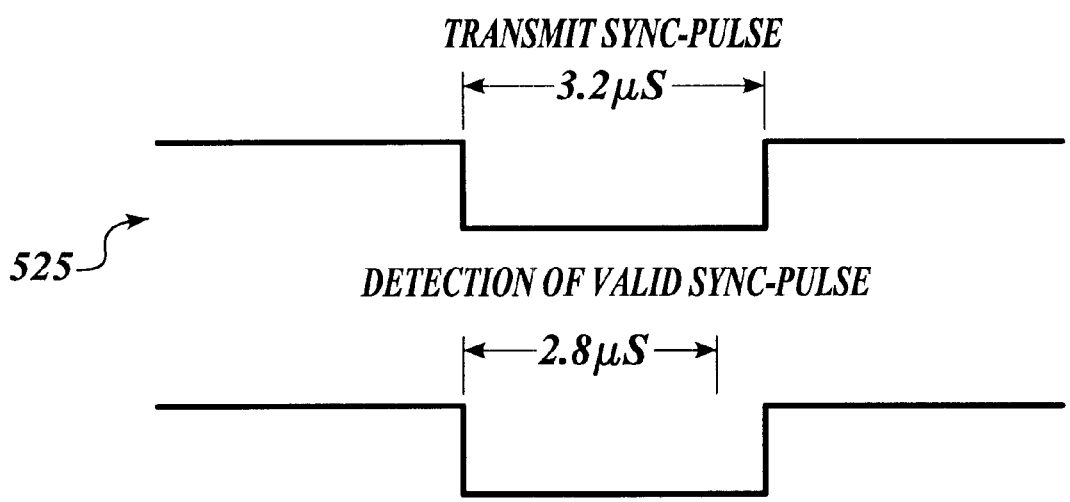
FIG. 18 illustrates the synchronization pulse transmitted by the network arbitrator of the invention on a predetermined time slot, preferably the last time slot, to provide inter-nodal synchronization and detection of a valid synchronization pulse.

FIG. 18 illustrates the synchronization pulse 525 transmitted by network arbitrator 502 on a predetermined time slot, preferably the last time slot, to provide inter-nodal synchronization. Synchronization pulse 525 has the preliminary format of, for example, logic low for 3.2 microseconds. Upon detecting synchronization pulse 525, network arbitrator 502 terminates any current transmission and sets its own timer to a predetermined value for synchronization to the system, except when synchronization pulse 525 is detected during a power-up test sequence. During a power-up test sequence, a detected synchronization pulse is ignored. Detection of a valid synchronization pulse 525 is also illustrated in FIG. 18.

Network failure detection depends upon driver topology. Generally, network arbitrator 502 is completely disabled if: the node identification parity fails; the computed CRC of the time table data and version does not match the actual CRC; the CRC of the time table data and version for one arbitrator 502 does not match the CRC for the companion arbitrator 502; clock oscillators 512 are out of synchronization; both arbitrators 502 disagree on data transmission a predetermined number of times, for example, 3 times; or both network busses fail. Network arbitrators 502 preferably do not directly detect a mismatch in node identifications, but data transmission will fail if node identities do not match because cross-enabling of data drivers does not occur until both arbitrators 502 agree.

Figure 19:
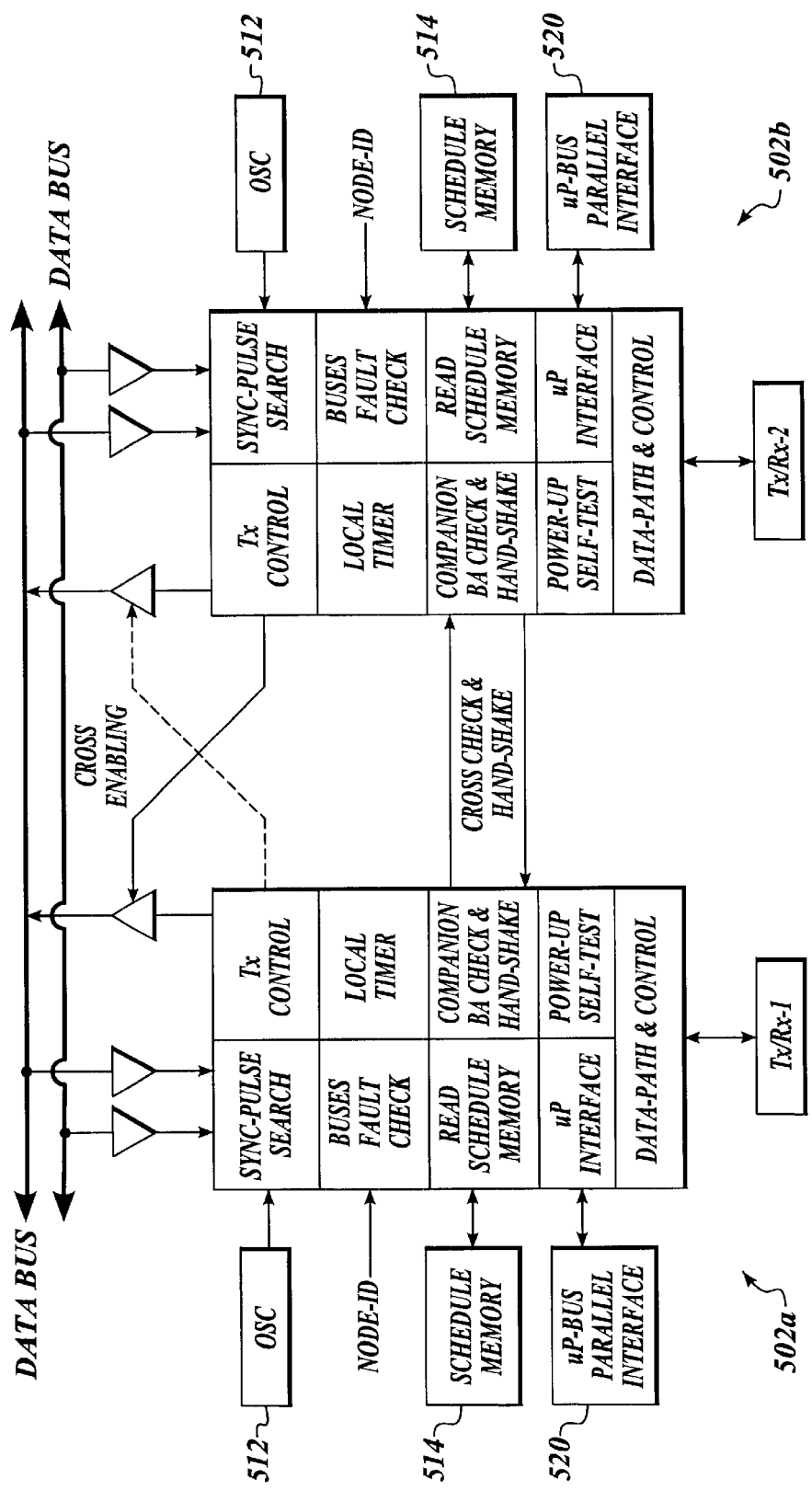
FIG. 19 is a block diagram illustrating the functions of the network arbitrator of the invention.

FIG. 19 is a block diagram illustrating the functions of the network arbitrator 502 of the invention.

While the preferred embodiment of the invention has been illustrated and described, it will be appreciated that various changes can be made therein without departing from the spirit and scope of the invention. Furthermore, although the preferred embodiment of the invention as disclosed above is particularly suited to aircraft safety and warning systems such as the IHAS described above in connection with FIG. 1, it will be appreciated that the data bus system of the invention could find application in many data processing applications where data integrity and fault tolerance are important. Also, it will be apparent that modifications of the particular system described above could be made by those who are skilled in the art that would fall within the scope of the invention claimed herein. Such modifications could arise from a number of factors including: the environment in which the data bus system is to be used, the availability and cost of hardware and the specific nature of the application.

What is claimed is:

1. A data bus system comprising:

a data bus including a data line for transmitting data in a plurality of time frames, each of said time frames divided into a plurality of time slots;

a processor having a corresponding application memory, said processor formulating a message for transmission on said data bus during one of said time slots;

a transmitter coupling said processor to said data line; and an arbitration circuit operatively coupled to said transmitter and said processor, said arbitration circuit generating a first signal enabling said transmitter and generating a second signal informing said processor of said enabling of said transmitter.

2. The data bus system recited in claim 1, wherein said arbitration circuit further determines an occurrence of said time slot and generates said first and second signals responsively to said occurrence.

3. The data bus system recited in claim 2, wherein said occurrence of said time slot is determined by a processor identification function.

4. The data bus system recited in claim 2, further comprising a table operatively coupled to said arbitration circuit for determining said occurrence of said time slot.

5. The data bus system recited in claim 4, further comprising a clock operatively coupled to said arbitration circuit.

6. The data bus system recited in claim 2, wherein:

said time slot is a first unique one of a plurality of time slots; and said processor comprises a first processor, said transmitter comprises a first transmitter, said arbitration circuit comprises a first arbitration circuit, and together said first processor, said first transmitter, and said first arbitration circuit comprise a first processing node; and further comprising a second processing node comprising:
  a second processor having a corresponding application memory, said second processor formulating a message for transmission on said data bus during a second unique one of said time slots;
  a second transmitter coupling said second processor to said data line; and
  a second arbitration circuit operatively coupled to said second transmitter and said second processor, said second arbitration circuit determining an occurrence of said second unique one of said time slots and responsively generating both a first signal enabling said second transmitter and a second signal informing said second processor of said enabling of said second transmitter.

7. The data bus system recited in claim 6, wherein said second arbitration circuit of said second processing node is synchronized with said first arbitration circuit of said first processing node.

8. The data bus system recited in claim 6, wherein:
said data line is one of a plurality of data lines;
said first processor formulates multiple ones of said message for transmission on different ones of said data lines;
said first transmitter is one of a plurality of first transmitters, each of said first transmitters coupling said first processor to a different one of said data lines;
said first arbitration circuit is one of a plurality of first arbitration circuits, each of said first arbitration circuits coupled to said first processor and to different ones of said first transmitters and generating said first signal enabling a corresponding one of said first transmitters and generating said second signal informing said first processor of said enabling of said corresponding first transmitter;
said second processor formulates multiple ones of said message for transmission on different ones of said data lines;
said second transmitter is one of a plurality of second transmitters, each of said second transmitters coupling said second processor to a different one of said data lines;
said second arbitration circuit is one of a plurality of second arbitration circuits, each of said second arbitration circuits coupled to said second processor and to different ones of said second transmitters and generating said first signal enabling a corresponding one of said second transmitters and generating said second signal informing said second processor of said enabling of said corresponding second transmitter.

9. The data bus system recited in claim 8, wherein each said first and second arbitration circuits further determines an occurrence of said time slot on a corresponding one of said data lines.

10. The data bus system recited in claim 9, wherein:
each said first arbitration circuits enables one of said first transmitters corresponding to a different one of said first arbitration circuits; and
each said second arbitration circuits enables one of said second transmitters corresponding to a different one of said second arbitration circuits.

11. The data bus system recited in claim 10, wherein ones of said second transmitters couple said second processor to identical ones of data lines as ones of said first transmitters couple said first processor.

12. The data bus system recited in claim 11, wherein:
each said first arbitration circuit coordinates with each other of said first arbitration circuits to generate each of said first and second signals; and
each said second arbitration circuit coordinates with each other of said second arbitration circuits to generate each of said first and second signals.

13. The data bus system recited in claim 12, wherein at least one of said first arbitration circuits coordinates with at least one of said second arbitration circuits to determine a position of said first unique one of a plurality of time slots.

14. The data bus system recited in claim 1, wherein:
said data line is one of a plurality of data lines;
said processor formulates said message for transmission on two or more of said data lines;
said transmitter is one of a plurality of transmitters, each of said transmitters coupling said processor to a different one of said data lines; and
said arbitration circuit is one of a plurality of arbitration circuits, each of said arbitration circuits coupled to said processor and to different ones of said transmitters and generating said first signal enabling a corresponding one of said transmitters and generating said second signal informing said processor of said enabling of said corresponding transmitter.

15. The data bus system recited in claim 14, wherein each said arbitration circuit further determines an occurrence of said time slot on a corresponding one of said data lines.

16. The data bus system recited in claim 15, further comprising a table operatively coupled to said arbitration circuits for determining said occurrence of each said time slot.

17. The data bus system recited in claim 16, wherein said table is one of a plurality of tables, one of said tables operatively coupled to different ones of said arbitration circuits.

18. The data bus system recited in claim 15, further comprising a clock operatively coupled to each of said arbitration circuits.

19. The data bus system recited in claim 18, wherein said clock is one of a plurality of independent clocks, ones of said clocks operatively coupled to different ones of said arbitration circuits.

20. The data bus system recited in claim 15, wherein each said arbitration circuit enables one of said transmitters corresponding to a different one of said arbitration circuits.

21. The data bus system recited in claim 20, wherein each said arbitration circuit coordinates with each other of said arbitration circuits to generate each of said first and second signals.

22. The data bus system recited in claim 15, wherein:
said processor is one of a plurality of processors, each said processor having a corresponding application memory and formulating a message for transmission on said data bus during one of said time slots;
each of said transmitters couple a different one of said processors to a different one of said data lines; and
each of said arbitration circuits is coupled to a different one of said processors and to a different one of said transmitters, each of said arbitration circuits generating both said first signal enabling a corresponding one of said transmitters and said second signal informing a corresponding one of said processors of said enabling of said corresponding one of said transmitters.

23. The data bus system recited in claim 22, wherein each of said processors cooperate during time periods selected for dual sourced operations and independently and concurrently run different applications during other time periods.

24. A data bus system comprising:

a data bus including a plurality of data lines for transmitting data in a plurality of time frames divided into a plurality of discrete time slots;

a plurality of processing nodes, each said processing node further comprising a processor for executing one or more application programs;

an application memory coupled to said processor, said application memory storing data resulting from said programs;

a pair of transmitters individually coupled to said application memory and to one or more data lines for transmitting said data to said data bus;

a time table for mapping said time slots in each of said frames into a data transmission channel wherein each of said channels is assigned to a predetermined one of said processing nodes for transmission of data from said application memory through each of said transmitters to said channel on said data lines;

a pair of interconnected arbitration circuits individually coupled to said time table and to said application memory and to a different one of said pair of transmitters, in response to said time table each said arbitration circuit individually enabling one of said transmitters and informing said processor of said enabling of said transmitter.

25. The system recited in claim 24, wherein each said arbitration circuit enables a one of said transmitters associated with an other of said arbitration circuits.

26. The system recited in claim 25, wherein said time table is one of a plurality of time tables and each arbitration circuit is coupled to a different one of said time tables.

27. The data bus system recited in claim 24, wherein each said arbitration circuit associated with one of said processing nodes is synchronized with each other of said arbitration circuits associated with said one of said processing nodes.

28. The data bus system recited in claim 24, wherein at least one of said arbitration circuits of a first one of said processing nodes coordinates with at least one of said arbitration circuits of a second one of said processing nodes.

29. The data bus system recited in claim 28, wherein said arbitration circuit of said first processing node is synchronized with said arbitration circuit of said second processing node.

30. The data bus system recited in claim 29, wherein each said arbitration circuit is further operatively coupled to an independent clock.

31. A protocol for placing data from a plurality of processing nodes on a data bus, the protocol comprising:

allocating to each of the plurality of processing nodes a predetermined number of time slots on a data bus in which to transmit data messages;

formulating a plurality of identical data messages in a processor associated with one of said processing nodes;

performing a plurality of independent determinations of an occurrence of one of said allocated time slots;

enabling a plurality of couplings between said processor and said data bus in response to a plurality of positive ones of said determinations of said occurrence of one of said allocated time slots;

informing said processor of said occurrence of one of said allocated time slots in response to said plurality of positive ones of said determinations; and placing said plurality of identical data messages on said data bus.

32. The protocol recited in claim 31, wherein said enabling further comprises a first enabling function acting on a coupling function associated with a second enabling function and a second enabling function acting on a coupling function associated with said first enabling function.

33. The protocol recited in claim 32, wherein said performing a plurality of independent determinations of an occurrence of one of said allocated time slots is associated with retrieving data defining said allocating.

* * * * *